(12) United States Patent
Russell

(10) Patent No.: US 10,757,399 B2
(45) Date of Patent: Aug. 25, 2020

(54) STEREO RENDERING SYSTEM

(71) Applicant: GOOGLE INC., Mountain View, CA (US)

(72) Inventor: Andrew Ian Russell, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 336 days.

(21) Appl. No.: 14/850,114

(22) Filed: Sep. 10, 2015

(65) Prior Publication Data

US 2017/0078651 A1    Mar. 16, 2017

(51) Int. Cl.
*H04N 13/344* (2018.01)
*H04N 13/117* (2018.01)
*H04N 13/366* (2018.01)
*G02B 27/01* (2006.01)
*H04N 13/15* (2018.01)
*H04N 13/133* (2018.01)

(52) U.S. Cl.
CPC ......... *H04N 13/344* (2018.05); *G02B 27/017* (2013.01); *G02B 27/0172* (2013.01); *H04N 13/117* (2018.05); *H04N 13/133* (2018.05); *H04N 13/15* (2018.05); *H04N 13/366* (2018.05); *G02B 2027/014* (2013.01); *G02B 2027/0112* (2013.01); *G02B 2027/0134* (2013.01); *G02B 2027/0138* (2013.01)

(58) Field of Classification Search
CPC .................................................. H04N 13/044
See application file for complete search history.

(56) References Cited

U.S. PATENT DOCUMENTS 7,391,887 B2    6/2008    Durnell et al.
7,542,210 B2    6/2009    Chirieleison et al.
(Continued)

FOREIGN PATENT DOCUMENTS

CN    101542536 A    9/2009
CN    102714739 A    10/2012
(Continued)

OTHER PUBLICATIONS

Hoffman, et al., "Vergence—accommodation conflicts hinder visual performance and cause visual fatigue", NIH Public Access Author Manuscript, J. Vis., 8(3): 33.1-3330., Jun. 1, 2010, 48 pages.
(Continued)

*Primary Examiner* — Brian T Pendleton
*Assistant Examiner* — Kyle M Lotfi
(74) *Attorney, Agent, or Firm* — Brake Hughes Bellermann LLP

(57) ABSTRACT

A method includes receiving an indication of a field of view associated with a three-dimensional (3D) image being displayed on a head mount display (HMD), receiving an indication of a depth of view associated with the 3D image being displayed on the HMD, selecting a first right eye image and a second right eye image based on the field of view, combining the first right eye image and the second right eye image based on the depth of view, selecting a first left eye image and a second left eye image based on the field of view, and combining the first left eye image and the second left eye image based on the depth of view.

19 Claims, 16 Drawing Sheets

(56) References Cited

U.S. PATENT DOCUMENTS

| | | | |
|---|---|---|---|
| 8,363,090 B1* | 1/2013 | Sayre | H04N 13/0022 |
| | | | 13/22 |
| 8,503,085 B2 | 8/2013 | Kim et al. | |
| 8,576,276 B2 | 11/2013 | Bar-Zeev et al. | |
| 8,611,015 B2 | 12/2013 | Wheeler et al. | |
| 8,704,882 B2 | 4/2014 | Turner et al. | |
| 8,736,692 B1 | 5/2014 | Wong et al. | |
| 9,137,524 B2* | 9/2015 | Maciocci | H04N 13/0484 |
| 9,172,944 B2* | 10/2015 | Tajiri | H04N 13/239 |
| 9,618,759 B2 | 4/2017 | Morifuji et al. | |
| 2002/0110275 A1 | 8/2002 | Rogina et al. | |
| 2010/0045783 A1 | 2/2010 | State et al. | |
| 2011/0181591 A1 | 7/2011 | Benitez et al. | |
| 2012/0154277 A1 | 6/2012 | Bar-Zeev et al. | |
| 2012/0236127 A1 | 9/2012 | Ojala et al. | |
| 2013/0088413 A1 | 4/2013 | Raffle et al. | |
| 2013/0194259 A1 | 8/2013 | Bennett et al. | |
| 2013/0235169 A1 | 9/2013 | Kato et al. | |
| 2013/0241805 A1 | 9/2013 | Gomez et al. | |
| 2014/0247286 A1 | 9/2014 | Chi | |
| 2014/0361984 A1 | 12/2014 | Kim et al. | |
| 2014/0362446 A1 | 12/2014 | Bickerstaff et al. | |
| 2015/0187115 A1 | 7/2015 | MacDonald et al. | |
| 2015/0312558 A1* | 10/2015 | Miller et al. | H04N 13/10402 |

FOREIGN PATENT DOCUMENTS

| | | |
|---|---|---|
| CN | 104509108 A | 4/2015 |
| CN | 104798370 A | 7/2015 |
| JP | 2006229725 A | 8/2006 |
| JP | 2012073702 A | 4/2012 |
| JP | 2012510733 A | 5/2012 |
| JP | 2014192550 A | 10/2014 |
| JP | 2015084150 A | 4/2015 |
| WO | 2014156033 A1 | 10/2014 |

OTHER PUBLICATIONS

International Search Report and Written Opinion received for PCT Patent Application No. PCT/US2016/051012, dated Dec. 7, 2016, 12 pages.

First Office Action with English translation for Chinese Application No. 201680027625.4, dated Dec. 28, 2018, 26 pages.

Office Action with English translation for Korean Application No. 10-2017-7031610, dated Oct. 4, 2018, 13 pages.

Communication pursuant to Article 94(3) EPC for EP Application No. 16767487.8, dated Jul. 16, 2019, 7 Pages.

* cited by examiner

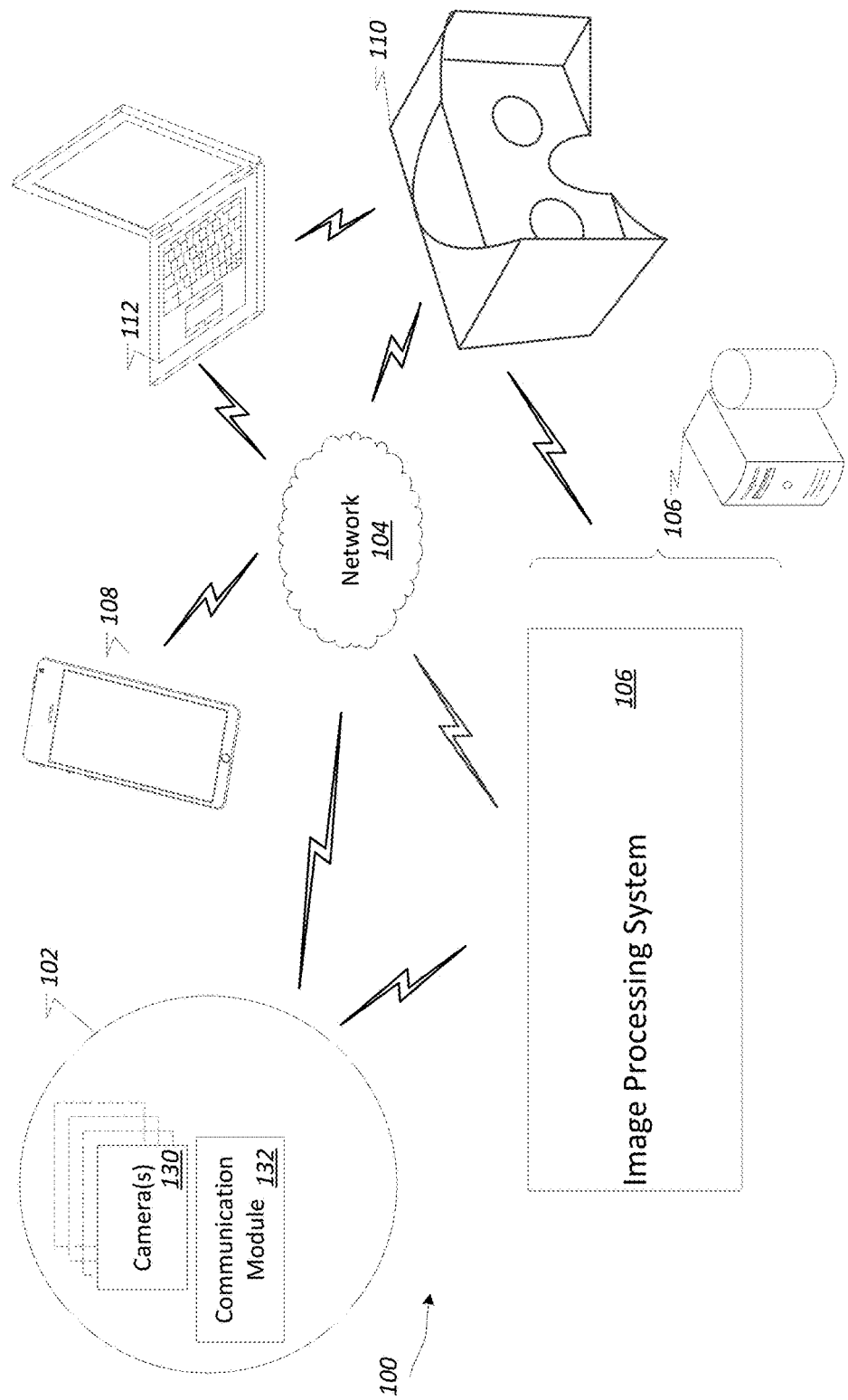

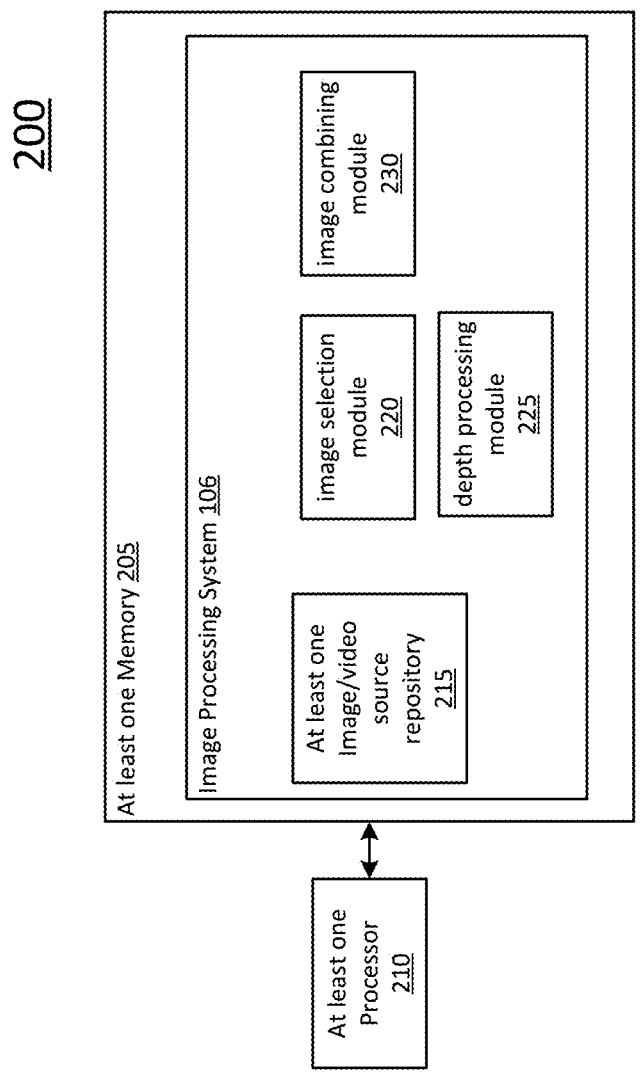

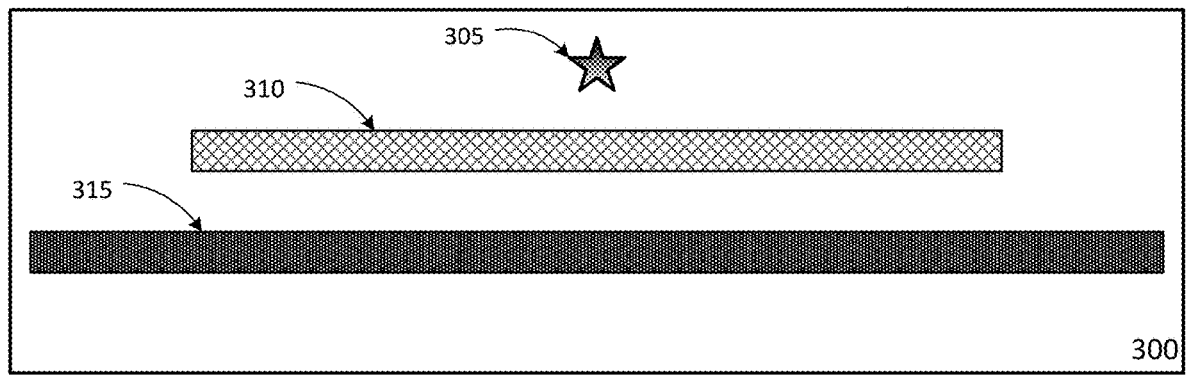
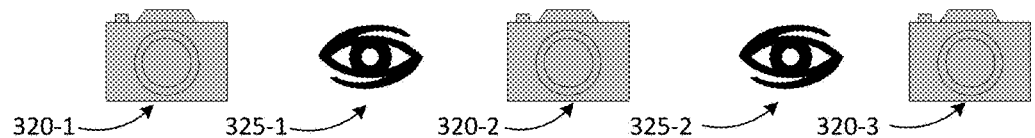
FIG. 3A
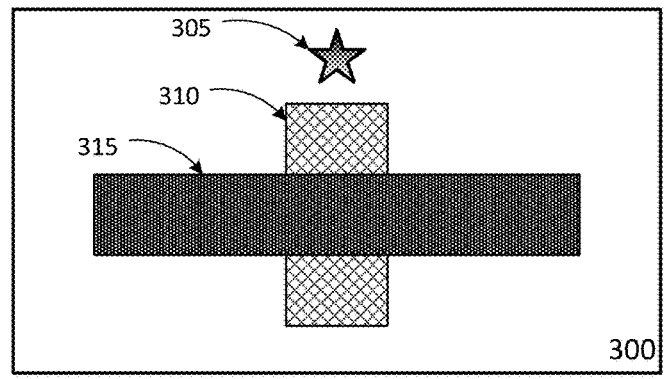
FIG. 3B

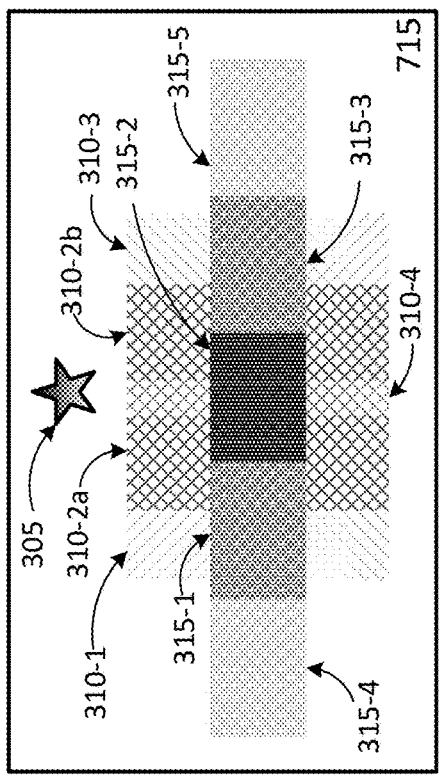
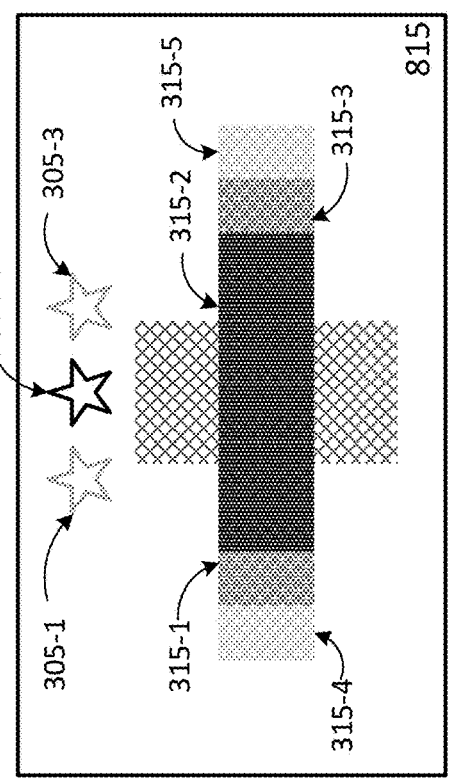
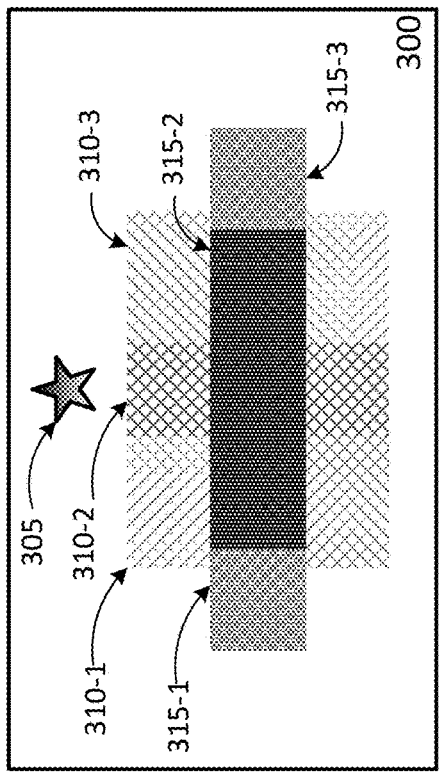
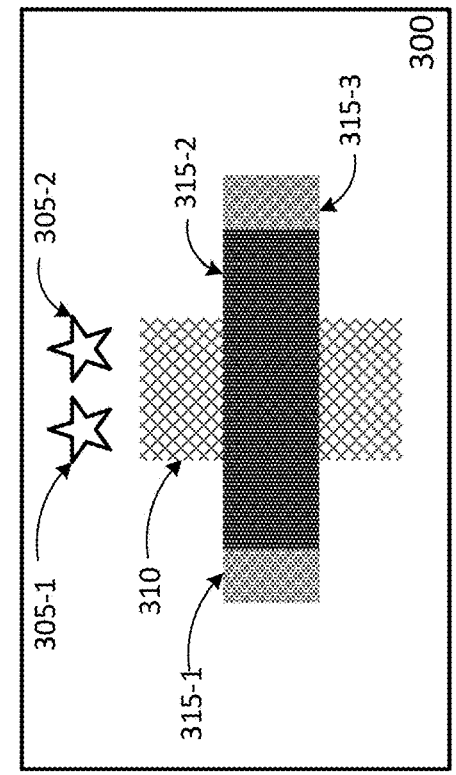
FIG. 11A
FIG. 11B
FIG. 11C
FIG. 11D

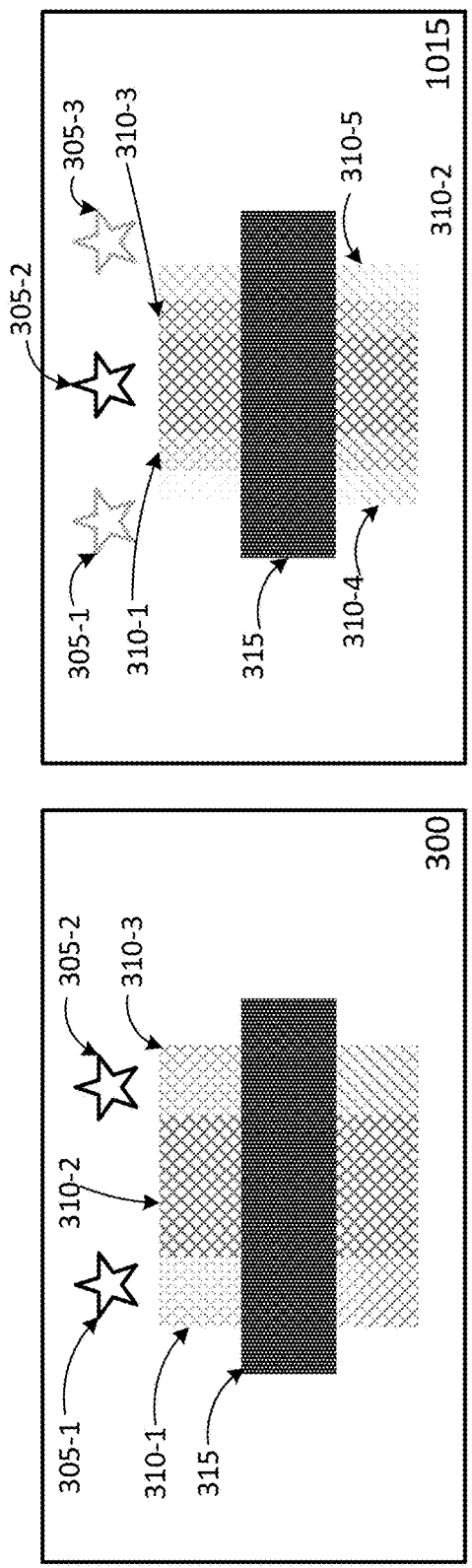

STEREO RENDERING SYSTEM

FIELD

Embodiments relate to rendering left eye and right eye images and/or video of a stereo image and/or video.

BACKGROUND

Typical stereo rendering involves computing a dense optical flow field between pairs of cameras, and then interpolating a viewpoint over the entire 3D image. This is difficult and even might be considered impossible in some cases, such as semi-transparent objects. Even for normal solid objects, this is difficult because most optical flow algorithms are too slow to be done in real-time. In other words, interpolating 3D images from captured 2D images can be processor intensive. As a result, generating 3D images and/or 3D video in real time to accomplish a desired playback user experience can be difficult. Therefore, it is desirable to render 3D images and/or 3D video without optical flow interpolation in real time and/or as the image or video is streamed.

SUMMARY

Example embodiments describe systems and methods to 3D images and/or video.

In a general aspect, a method includes receiving an indication of a field of view associated with a three-dimensional (3D) image being displayed on a head mount display (HMD), receiving an indication of a depth of view associated with the 3D image being displayed on the HMD, selecting a first right eye image and a second right eye image based on the field of view, combining the first right eye image and the second right eye image based on the depth of view, selecting a first left eye image and a second left eye image based on the field of view, and combining the first left eye image and the second left eye image based on the depth of view.

In another general aspect, a method includes streaming a three-dimensional (3D) video to a head mount display (HMD). Each frame of the 3D video includes a left eye image and a right eye image. The method further includes generating a subsequent frame which includes determining a field of view associated with the 3D video, determining a depth of view associated with the 3D video, selecting a first right eye image and a second right eye image based on the field of view, combining the first right eye image and the second right eye image as the right eye image based on the depth of view, selecting a first left eye image and a second left eye image based on the field of view, and combining the first left eye image and the second left eye image as the left eye image based on the depth of view.

In yet another general aspect, a non-transitory computer-readable storage medium having stored thereon computer executable program code which, when executed on a computer system, causes the computer system to perform steps. The steps include receiving an indication of a field of view associated with a three-dimensional (3D) image being displayed on a head mount display (HMD), receiving an indication of a depth of view associated with the 3D image being displayed on the HMD, selecting a first right eye image and a second right eye image based on the field of view, combining the first right eye image and the second right eye image based on the depth of view, selecting a first left eye image and a second left eye image based on the field of view, and combining the first left eye image and the second left eye image based on the depth of view.

Implementations can include one or more of the following features. For example, selecting of the first right eye image and of the second right eye image can include determining a right eye position of a user of the HMD, selecting the first right eye image as an image taken by a first camera positioned to the right of the right eye position, and selecting the second right eye image as an image taken by a second camera positioned to the left of the right eye position.

For example, selecting of the first left eye image and of the second left eye image can include determining a left eye position of a user of the HMD, selecting the first left eye image as an image taken by a first camera positioned to the right of the left eye position, and selecting the second left eye image as an image taken by a second camera positioned to the left of the left eye position. The first right eye image, the second right eye image, the first left eye image and the second left eye image can be selected from a plurality of images captured at substantially the same moment in time. The combining of the first right eye image and the second right eye image can include shifting the first right eye image with respect to the second right eye image until a portion of a combined image, based on the depth of view, is sharp. The combining of the first right eye image and the second right eye image can include shifting both the first right eye image and the second right eye image toward the center of the field of view until a portion of a combined image, based on the depth of view, is sharp.

For example, the combining of the first right eye image and the second right eye image can include color merging such that a portion of the combined image has substantially a same color palette as a corresponding portion of at least one of the first right eye image and the second right eye image. The combining of the first right eye image and the second right eye image can include color merging using a color offset based on a weighted offset associated with a camera distance from the center of the field of view. The first left eye image, the second left eye image, the first left eye image and the second left eye image can be selected from a plurality of images captured at substantially the same moment in time. The combining of the first left eye image and the second left eye image can include shifting the first left eye image with respect to the second left eye image until a portion of a combined image, based on the depth of view, is sharp.

For example, the combining of the first left eye image and the second left eye image can include shifting both the first left eye image and the second left eye image toward the center of the field of view until a portion of a combined image, based on the depth of view, is sharp. The combining of the first left eye image and the second left eye image can include color merging the combined image such that a portion of the combined image has substantially a same color palette as a corresponding portion of at least one of the first left eye image and the second left eye image. The combining of the first left eye image and the second left eye image can include color merging the combined image using a color offset based on a weighted offset associated with a camera distance from the center of the field of view.

For example, selecting of the first right eye image and of the second right eye image can include determining a right eye position of a user of the HMD, selecting the first right eye image as an image taken by a first camera positioned to the right of the right eye position, and selecting the second right eye image as an image taken by a second camera positioned to the left of the right eye position. For example, selecting of the first left eye image and of the second left eye image can include determining a left eye position of a user of the HMD, selecting the first left eye image as an image taken by a first camera positioned to the right of the left eye position, and selecting the second left eye image as an image taken by a second camera positioned to the left of the left eye position.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein:

FIG. 1 illustrates a block diagram of a system for capturing and rendering an image and/or video according to at least one example embodiment.

FIG. 2 illustrates a block diagram of an image processing system according to at least one example embodiment.

FIG. 3A illustrates a top view perspective of a block diagram of an image capture configuration according to at least one example embodiment.

FIG. 3B illustrates a front view perspective of a block diagram of the image capture configuration according to at least one example embodiment.

FIGS. 11A and 11B illustrate diagrams of a side by side comparison of visualized images at a far depth of view according to at least one example embodiment.

FIGS. 11C and 11D illustrate diagrams of a side by side comparison of visualized images at a mid depth of view according to at least one example embodiment.

FIGS. 11E and 11F illustrate diagrams of a side by side comparison of visualized images at a near depth of view according to at least one example embodiment.

Figure 4:
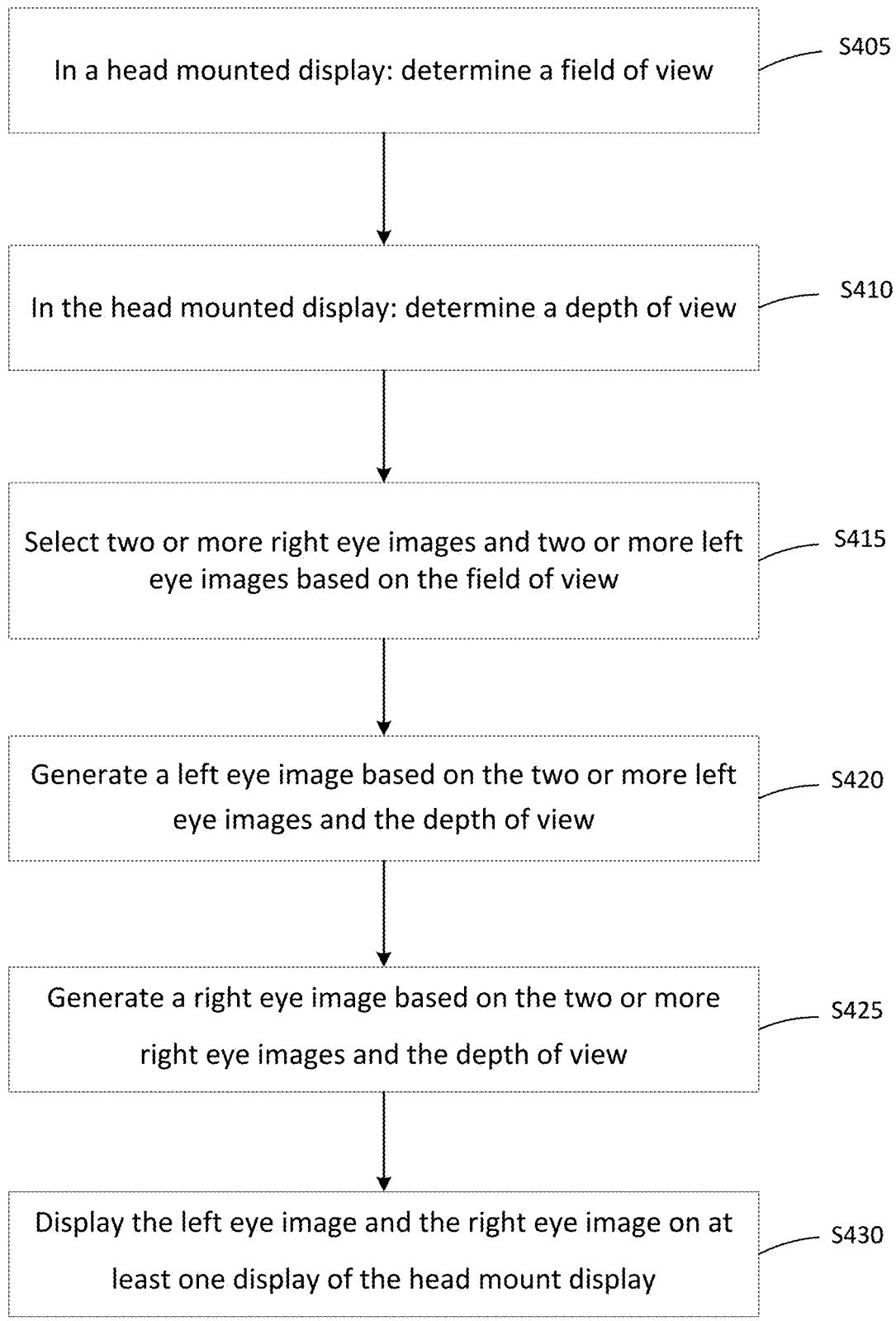
FIG. 4 illustrates a block diagram of a method according to at least one example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

FIG. 1 is a block diagram of an example system 100 for capturing and rendering images and/or video in a 3D virtual reality (VR) environment. In the example system 100, a camera rig 102 can capture and provide images over a network 104, or alternatively, can provide the images directly to an image processing system 106 for analysis and processing. In some implementations of system 100, the image processing system 106 can store, modify and/or stream images and/or video based on images captured by the camera rig 102. The image processing system 106 is described in more detail below. In some implementations of system 100, a mobile device 108 can function as the camera rig 102 to provide images throughout network 104. Once the images are captured, the image processing system 106 can perform a number of calculations and processes on the images and provide the processed images to a head mounted display (HMD) device 110 for rendering via network 104, for example. In some implementations, the image processing system 106 can also provide the processed images to mobile device 108 and/or to computing device 112 for rendering, storage, or further processing.

The HMD device 110 may represent a virtual reality headset, glasses, eyepiece, or other wearable device capable of displaying virtual reality content. In operation, the HMD device 110 can execute a VR application (not shown) which can playback received and/or processed images to a user. In some implementations, the VR application can be hosted by one or more of the devices 106, 108, or 112, shown in FIG. 1. In one example, the HMD device 110 can provide a video playback of a scene captured by camera rig 102. In another example, the HMD device 110 can provide playback of still images stitched into a single scene.

The camera rig 102 can be configured for use as a camera (also can be referred to as a capture device) and/or processing device to gather image data for rendering content in a VR environment. For example, in describing the functionality of system 100, FIG. 1 shows the camera rig 102 without cameras disposed around the rig to capture images. Other implementations of camera rig 102 can include any number of cameras that can be disposed around the circumference of a circular camera rig, such as rig 102.

As shown in FIG. 1, the camera rig 102 includes a number of cameras 130 and a communication system 132. The cameras 130 can include a single still camera or single video camera. In some implementations, the cameras 130 can include multiple still cameras or multiple video cameras disposed (e.g., seated) side-by-side along the outer periphery (e.g., ring) of the camera rig 102. The cameras 130 may be a video camera(s), an image sensor(s), a stereoscopic camera(s), an infrared camera(s), a mobile device and/or the like. The communication system 132 can be used to upload and download images, instructions, and/or other camera related content. The communication may be wired or wireless and can interface over a private or public network.

In some implementations, the camera rig 102 includes multiple digital video cameras that are disposed in a side-to-side or back-to-back fashion such that their lenses each point in a radially outward direction to view a different portion of the surrounding scene or environment. In some implementations, the multiple digital video cameras are disposed in a tangential configuration with a viewing direction tangent to the circular camera rig 102. For example, the camera rig 102 can include multiple digital video cameras that are disposed such that their lenses each point in a radially outward direction while being arranged tangentially to a base of the rig. The digital video cameras can be pointed to capture content in different directions to view different angled portions of the surrounding scene.

In some implementations, the cameras can be configured (e.g., set up) to function synchronously to capture video from the cameras on the camera rig at a specific point in time. In some implementations, the cameras can be configured to function synchronously to capture particular portions of video from one or more of the cameras over a time period. Another example of calibrating the camera rig can include configuring how incoming images are stored. For example, incoming images can be stored as individual frames or video (e.g., .avi files, .mpg files) and such stored images can be uploaded to the Internet, another server or device, or stored locally with each camera on the camera rig 102. In some implementations, incoming images can be stored as encoded video.

In the example system 100, the devices 106, 108, and 112 may be a laptop computer, a desktop computer, a mobile computing device, or a gaming console. In some implementations, the devices 106, 108, and 112 can be a mobile computing device that can be disposed (e.g., placed/located) within the HMD device 110. The mobile computing device can include a display device that can be used as the screen for the HMD device 110, for example. Devices 106, 108, and 112 can include hardware and/or software for executing a VR application. In addition, devices 106, 108, and 112 can include hardware and/or software that can recognize, monitor, and track 3D movement of the HMD device 110, when these devices are placed in front of or held within a range of positions relative to the HMD device 110. In some implementations, devices 106, 108, and 112 can provide additional content to HMD device 110 over network 104. In some implementations, devices 102, 106, 108, 110, and 112 can be connected to/interfaced with one or more of each other either paired or connected through network 104. The connection can be wired or wireless. The network 104 can be a public communications network or a private communications network.

In a HMD (e.g., HMD device 110), a viewer experiences a visual virtual reality through the use of a left (e.g., left eye) display and a right (e.g., right eye) display that projects a perceived three-dimensional (3D) video or image. According to example embodiments, a stereo or 3D video or image is stored on a server (e.g., as a plurality of associated 2D images as captured by the camera rig 102). The video or image can be encoded and streamed to the HMD from the server. The 3D video or image can be encoded as a left image and a right image which packaged (e.g., in a data packet) together with metadata about the left image and the right image. The left image and the right image are then decoded and displayed by the left (e.g., left eye) display and the right (e.g., right eye) display. According to example embodiments, the left image and the right image can be images generated (e.g., combined as one image) based on two or more images synchronously captured. According to example embodiments, the left image and the right image can be images generated (e.g., combined as one image) based on a field of view and or a depth of view The system(s) and method(s) described herein are applicable to both the left image and the right image and are referred to throughout this disclosure as an image, frame, a portion of an image, a portion of a frame, a tile and/or the like depending on the use case. In other words, the encoded data that is communicated from a server (e.g., streaming server) to a user device (e.g., a HMD) and then decoded for display can be a left image and/or a right image associated with a 3D video or image.

The system 100 may include electronic storage. The electronic storage can include non-transitory storage media that electronically stores information. The electronic storage may be configured to store captured images, obtained images, pre-processed images, post-processed images, etc. Images captured with any of the disclosed camera rigs can be processed and stored as one or more streams of video, or stored as individual frames. In some implementations, storage can occur during capture and rendering can occur directly after portions of capture to enable faster access to content earlier than if capture and processing were concurrent.

FIG. 2 illustrates a block diagram of an apparatus 200 including the image processing system 106 according to at least one example embodiment. As shown in FIG. 2, the apparatus 200 can include at least one memory 205 and at least one processor 210. The at least one memory 205 can include the image processing system 106. The image processing system 106 can include at least one image/video source repository 215, an image selection module 220, a depth processing module 225 and an image combining module 230. The apparatus 200 can be an element of at least one of the devices 106, 108, 110 or 112. Further, elements of the apparatus 200 can be divided amongst at least one of the devices 106, 108, 110 or 112. For example, the at least one image/video source repository 215 could be included in aforementioned electronic storage associated with the image processing system 106 whereas the depth processing module 225 could be a subsystem of the HMD 110.

The at least one image/video source repository 215 can be configured to store a plurality of 2D and/or 3D images and/or video. The images and/or video can represent scenes captured by camera(s) 130 and communicated to the at least one image/video source repository 215 by the camera rig 102 using the communication module 132. The images and/or video can have corresponding metadata indicating camera position, field of view, image resolution, capture time, frame order and/or the like.

The image selection module 220 can be configured to select 2D images from the image/video source repository 215 based on an indication of a field of view (e.g., received from the HMD 110). For example, the image selection module 220 can select two or more right eye images and two or more left eye images based on the field of view from the image/video source repository 215. The two or more right eye images and the two or more left eye images can be images of a scene taken by different cameras 130 at substantially the same moment in time. The selection can be based on the corresponding metadata for the images stored in the image/video source repository 215.

The depth processing module 225 can be configured to determine a depth of view or focal depth of a user viewing an image and/or video using the HMD 110. For example, the HMD 110 can include an eye tracking device (e.g., first eye tracking sensor 1220-L and second eye tracking sensor 1220-R illustrated in FIG. 12B) configured to determine the depth of view and/or perform a measurement from which the depth of view can be determined. For example, the eye tracking device can measure a position of the pupils of the user's eyes. The eye tracking device can measure convergence of the pupils and determine angle C (see FIG. 13A). Angle C can be used to determine the depth of view.

The image combining module 230 can be configured to combine two or more images in order to generate third image which is then communicated to the HMD 110 for rendering on a display of the HMD 110. For example, the left eye image can be generated by combining the two or more left eye images such that the combined image is sharp (e.g., not distorted or not blurred) at the depth of view. In order to generate a combined image a first image (e.g., as captured by camera 320-1) can be shifted with respect to a second image (e.g., as captured by camera 320-2) captured at the same (or substantially the same) time as the first image until a portion of the combined image is sharp (e.g., the portion of the first image at the depth of view substantially overlaps the portion of the second image at the same depth of view). In an example implementation, the first image is shifted a number of pixels based on a distance between the two cameras and an angle (e.g., C, see FIG. 13A). In another example implementation, both images are shifted toward the center of the field of view (e.g., to the center of the left eye) based on the corresponding camera position as relates to the position of the field of view and until a portion (corresponding to the depth of view) of the combined image is sharp.

FIG. 3A illustrates a top view perspective of a block diagram of an image capture configuration according to at least one example embodiment. As shown in FIG. 3A the configuration includes three portions of an image 300. The three portions of the image 300 include a far portion 305 of the image 300, a mid portion 310 of the image 300 and a near portion 315 of the image 300. The far, mid and near indicate focal depths associated with a viewer (e.g., having eyes 325-1 and 325-2) of the image 300. In other words, the far portion 305 of the image 300 is at a relatively far focal depth as viewed by the viewer, the mid portion 310 of the image 300 is relatively between the near and far focal depth as viewed by the viewer, and the near portion 315 of the image 300 is at a relatively near or close focal depth as viewed by the viewer.

FIG. 3B illustrates a front view perspective of the block diagram of the image 300 capture configuration according to at least one example embodiment. As shown in FIG. 3B, the near portion 315 of the image 300 is illustrated as in front of the mid portion 310 of the image 300. Further, the far portion 305 of the image 300 is illustrated as behind (and above for clarity) the near portion 315 of the image 300 and the mid portion 310 of the image 300.

In an example embodiment, 3D image capture can include the use of more than one camera each at a different position. This is illustrated by cameras 320-1, 320-2 and 320-3. Cameras 320-1, 320-2 and 320-3 can be digital cameras configured to capture still images, a video and/or frames of a video.

FIG. 4 illustrates a block diagram of a method according to at least one example embodiment. As shown in FIG. 4, in step S405 a field of view is determined. For example, the HMD 110 can include an accelerometer to monitor a position or a movement of a user of the HMD's 110 head. For example, a device (e.g., a camera and/or an infrared sensor) external to the HMD 110 can monitor a position or a movement of a user of the HMD's 110 head. For example, the HMD 110 can include an eye tracking device (e.g., first eye tracking sensor 1220-L and second eye tracking sensor 1220-R as shown in FIG. 12B) configured to determine a direction of gaze. From the position and/or movement of the HMD 110 and/or the direction of gaze, a field of view can be determined. In other words, the position and/or movement of the HMD 110 and/or the direction of gaze can determine what (e.g., field of view) the user of the HMD 110 is looking at.

In step S410 a depth of view is determined. For example, the HMD 110 can include an eye tracking device (e.g., first eye tracking sensor 1220-L and second eye tracking sensor 1220-R) configured to determine the depth of view and or perform a measurement from which the depth of view can be determined. For example, the eye tracking device can measure a position of the pupils of the user's eyes. The eye tracking device can measure convergence of the pupils and determine angle C (see FIG. 13A). Angle C can be used to determine the depth of view. The depth processing module 225 can be configured to use the measurements and/or an indication of depth of view received from the HMD 110 in order to determine the depth of view as it relates to an image.

In step S415 two or more right eye images and two or more left eye images are selected based on the field of view. For example, images can be selected from a datastore (e.g., memory and/or database) and/or based on a live capture. For example, the image selection module 220 can select 2D images from the image/video source repository 215 based on an indication of a field of view for each of the left eye and the right eye. In an example implementation, a plurality of cameras (e.g., camera 320-1, 320-2, 320-3 or 1230) can be used to capture images and/or video. The field of view for the left eye can be between two of the cameras (e.g., camera 320-1 and 320-2) and the field of view for the right eye can be between two (e.g., different) cameras (e.g., camera 320-2 and 320-3). Therefore, an image captured by each of the cameras flanking the left eye (e.g., camera 320-1 and 320-2) can be selected and an image captured by each of the cameras flanking the right eye (e.g., camera 320-2 and 320-3) can be selected.

In step S420 a left eye image is generated based on the two or more left eye images and the depth of view. For example, the left eye image can be generated (e.g., by the image combining module 230) by combining the two or more left eye images such that the combined image is sharp (e.g., not distorted or not blurred) at the depth of view. In order to generate a combined image a processor (e.g., processor 210 executing a set of instructions) can shift a first image (e.g., as captured by camera 320-1) with respect to a second image (e.g., as captured by camera 320-2) captured at the same (or substantially the same) time as the first image until a portion of the combined image is sharp (e.g., the portion of the first image at the depth of view substantially overlaps the portion of the second image at the same depth of view). In an example implementation, the first image is shifted a number of pixels based on a distance between the two cameras and an angle (e.g., C, see FIG. 13A). In another example implementation, both images are shifted toward the center of the field of view (e.g., to the center of the left eye) until a portion (corresponding to the depth of view) of the combined image is sharp.

Then the first image and the second image can be combined (e.g., overlaid) with one another based on the shift. Further, a post processing may occur. For example, a color merging or adjustment may be performed such that the combined portion of the image has substantially the same color palette as the portion of the image in the first image and/or second image. For example, a color (or pixel data value) offset may be determined and applied across the combined image. The color offset can be a weighted offset based on a camera distance from the center of the field of view.

In step S425 a right eye image is generated based on the two or more right eye images and the depth of view. For example, the right eye image can be generated (e.g., by the image combining module 230) by combining the two or more right eye images such that the combined image is sharp (e.g., not distorted or not blurred) at the depth of view. In order to generate a combined image a processor (e.g., processor 210 executing a set of instructions) can shift a first image (e.g., as captured by camera 320-2) with respect to a second image (e.g., as captured by camera 320-3) captured at the same (or substantially the same) time as the first image until a portion of the combined image is sharp (e.g., the portion of the first image at the depth of view substantially overlaps the portion of the second image at the same depth of view). In an example implementation, the first image is shifted a number of pixels based on a distance between the two cameras and an angle (e.g., C, see FIG. 13A). In another example implementation, both images are shifted toward the center of the field of view (e.g., to the center of the right eye) until a portion (corresponding to the depth of view) of the combined image is sharp.

Then the first image and the second image can be combined (e.g., overlaid) with one another based on the shift. Further, a post processing may occur. For example, a color merging or adjustment may be performed such that the combined portion of the image has substantially the same color palette as the portion of the image in the first image and/or second image. For example, a color (or pixel data value) offset may be determined and applied across the combined image. The color offset can be a weighted offset based on a camera distance from the center of the field of view.

In step S430 the left eye image and the right eye image are displayed on at least one display of the HMD 110. For example, the HMD 110 can have a first display associated with the left eye and a second display associated with the right eye. The generated left eye image can be rendered on the first display and the generated right eye image can be rendered on the second display. In an example implementation, the HMD 110 can include a single display including a first portion associated with the left eye and a second portion associated with the right eye.

Figure 5A:
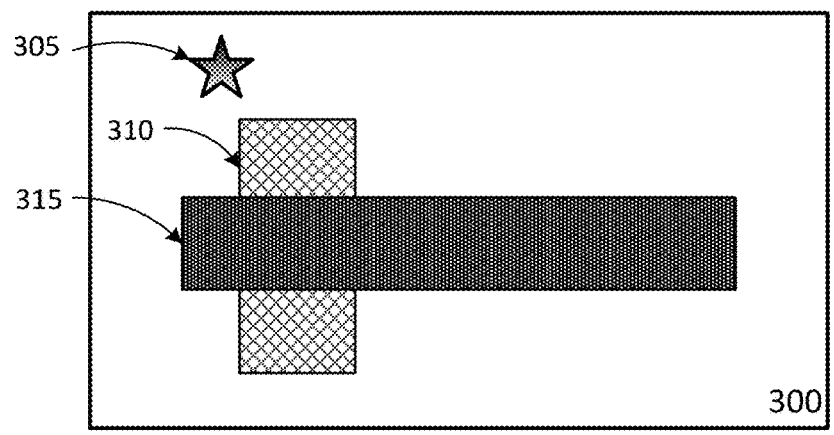
FIGS. 5A, 5B and 5C illustrate an image as captured by cameras positioned to the center, to the left and to the right of a scene to be captured according to at least one example embodiment.
Figure 5B:
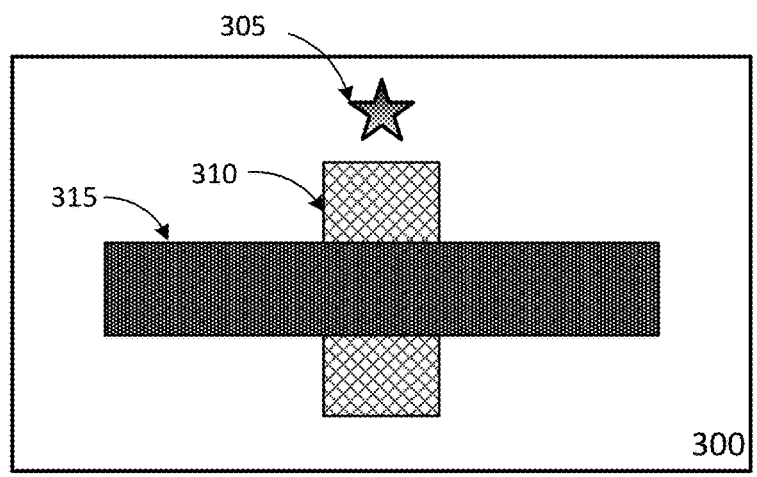
Figure 5C:
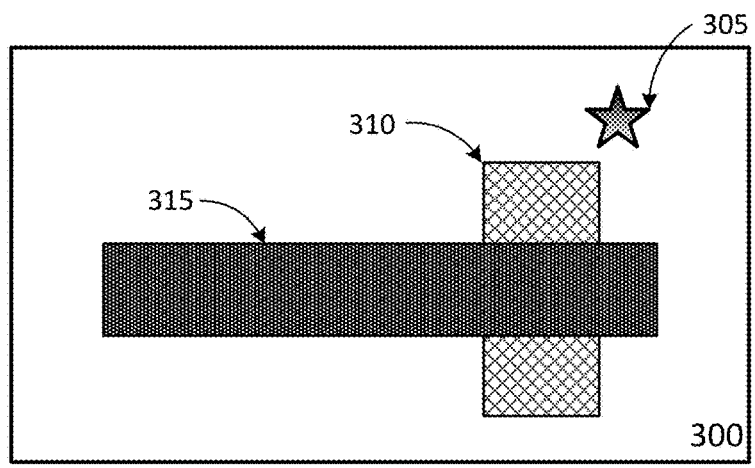
Figure 6A:
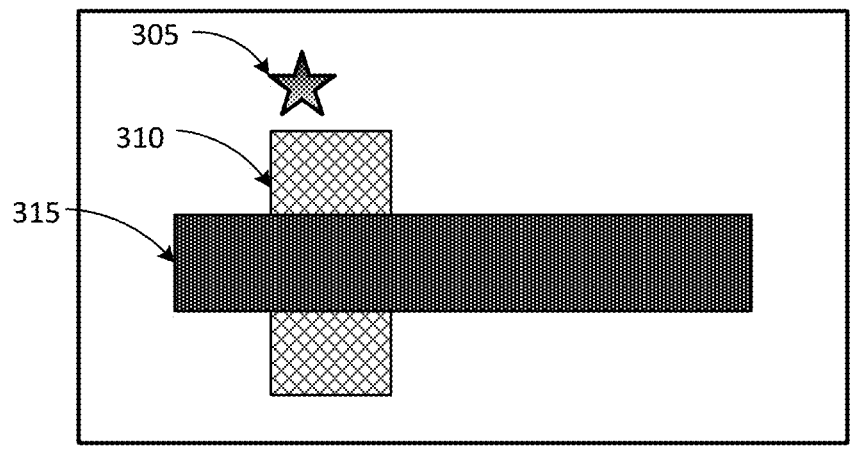
FIGS. 6A and 6B illustrate the same image as viewed by eyes along the same plane as the cameras according to at least one example embodiment.
Figure 6B:
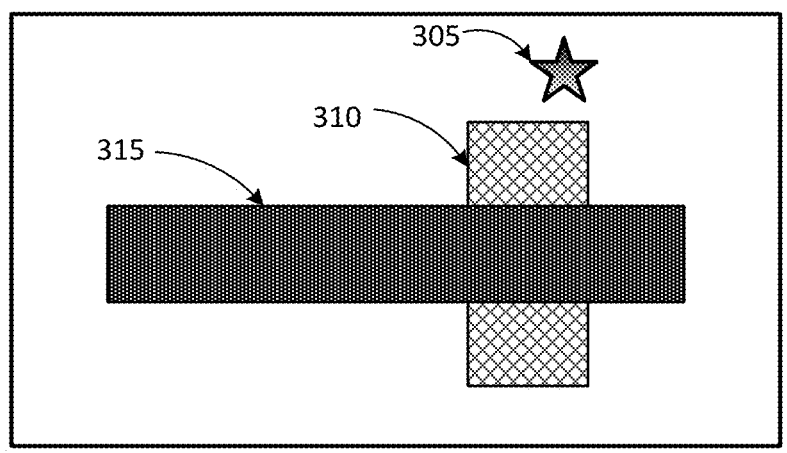

FIGS. 5A, 5B and 5C illustrate image 300 as captured by camera 320-1, 320-2 and 320-3, respectively. FIGS. 6A and 6B illustrate image 300 as viewed by eyes 325-1 and 325-2, respectively. As shown in FIG. 5B, camera 320-2 can capture image 300 substantially straight on as there are minimal (if any) differences when comparing image 300 as shown in FIG. 3B to image 300 as shown in FIG. 5B. Contrast, image 300 as captured by camera 320-1 as shown in FIG. 5A. As can be seen, image 300 is shown with the near portion 315 shifted to the right (or away from camera 320-1) as compared to the mid portion 310 and the far portion 305 shifted to the left (or toward camera 320-1) as compared to the mid portion 310. Further, image 300 as captured by camera 320-3 as shown in FIG. 5C is shown with the near portion 315 shifted to the left (or away from camera 320-3) as compared to the mid portion 310 and the far portion 305 shifted to the right (or toward camera 320-3) as compared to the mid portion 310.

As shown in FIG. 6A image 300 as viewed by eye 325-1 (e.g., as viewed with eye 325-2 closed) is somewhat similar to image 300 as captured by camera 320-1 or as illustrated in FIG. 5A. Accordingly, in FIG. 6A, image 300 is shown with the near portion 315 shifted to the right (or away from eye 325-1) as compared to the mid portion 310 and the far portion 305 shifted to the left (or toward eye 325-1) as compared to the mid portion 310. As shown in FIG. 6B image 300 as viewed by eye 325-2 (e.g., as viewed with eye 325-1 closed) is somewhat similar to image 300 as captured by camera 320-3 or as illustrated in FIG. 5C. Accordingly, in FIG. 6A, image 300 is shown with the near portion 315 shifted to the left (or away from eye 325-2) as compared to the mid portion 310 and the far portion 305 shifted to the right (or toward eye 325-2) as compared to the mid portion 310.

Figure 7A:
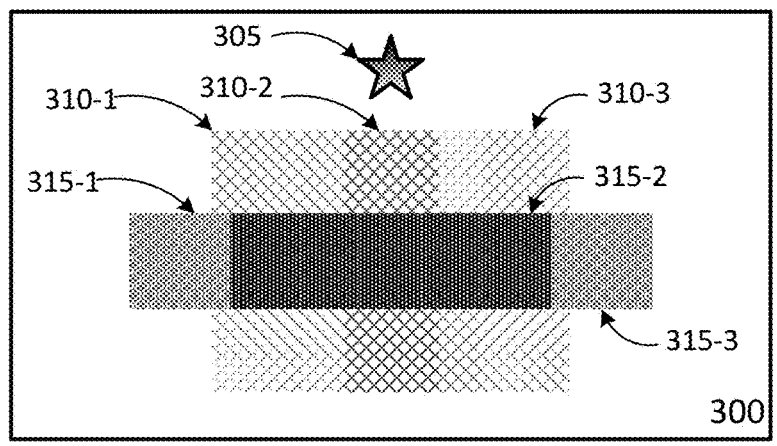
FIGS. 7A, 7B and 7C illustrate the image as visualized by the human visual system.
Figure 7B:
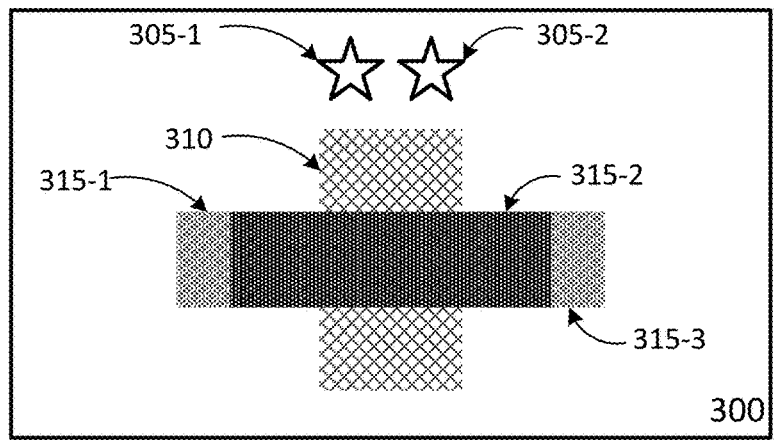
Figure 7C:
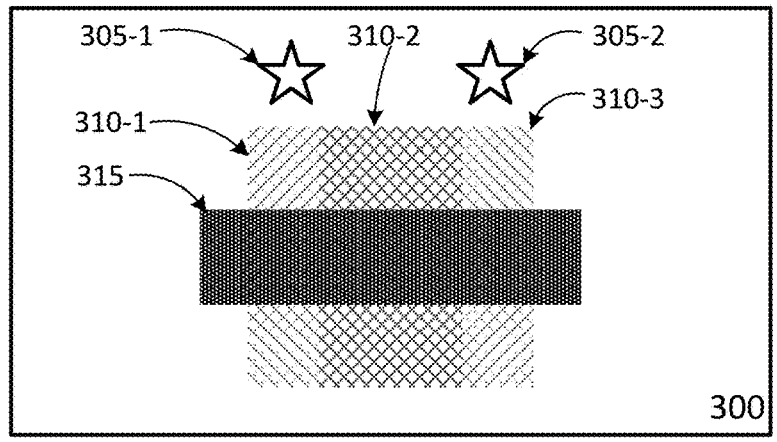

FIGS. 7A, 7B and 7C illustrate the scene represented by image 300 as visualized by the human visual system. For example, FIGS. 7A, 7B and 7C illustrate image 300 as visualized by the human visual system when viewed in real time or in the real world. FIG. 7A illustrates the scene represented by image 300 as visualized by the human visual system when the depth of focus is far. In other words, FIG. 7A illustrates a visualization of the scene represented by image 300 when viewed in real time or in the real world and the eyes (e.g., eyes 205-1, 205-2 or 325-1, 325-2) are focused on the scene represented by the far portion 305 of the scene represented by the image 300.

As shown in FIG. 7A, the far portion 305 of the image 300 is as shown in FIG. 3B. In other words, the far portion 305 of the image 300 is illustrated as behind (and above for clarity) the near portion 315 of the image 300 and the mid portion 310 of the image 300. The far portion 305 of the image 300 is also the shape (e.g., a single shaded star) as shown in FIG. 3B. However, in FIG. 7A, the near portion 315 of the image 300 and the mid portion 310 of the image 300 are shown as distorted when compared to the near portion 315 of the image 300 and the mid portion 310 of the image 300 as shown in FIG. 3B. This is so, because the human visual system can only see clearly at one depth of focus.

As shown in FIG. 7A, the near portion 315 of the image 300 and the mid portion 310 of the image 300 are shown as double vision portions. For example, the near portion 315 of the image 300 is split into three visualized near portions 315-1, 315-2 and 315-3. Visualized near portion 315-2 is shown as having the same shape and shading as the near portion 315 of the image 300 shown in FIG. 3B. However, visualized near portion 315-2 is shown as being narrower than the near portion 315 of the image 300 shown in FIG. 3B. Visualized near portions 315-1 and 315-3 are shown as having the same shape and a lighter shading compared to the near portion 315 of the image 300 shown in FIG. 3B. Visualized near portions 315-1 and 315-3 are shown as extending the width of the near portion 315 of the image 300 past the width of the mid portion 310 of the image 300 similar to the mid portion 310 of the image 300 as shown in FIG. 3B. Visualized near portions 315-1 and 315-3 can represent the double vision portion of the near portion 315 of the image 300 when viewed in real time or in the real world and the eyes (e.g., eyes 205-1, 205-2 or 325-1, 325-2) are focused on the scene represented by the far portion 305 of the image 300.

For example, the mid portion 310 of the image 300 is split into three visualized mid portions 310-1, 310-2 and 310-3. Visualized mid portion 310-2 is shown as having the same shape and shading as the mid portion 310 of the image 300 shown in FIG. 3B. However, visualized mid portion 310-2 is shown as being narrower than the mid portion 310 of the image 300 shown in FIG. 3B. Visualized mid portions 310-1 and 310-3 are shown as having the same shape and a lighter shading compared to the mid portion 310 of the image 300 shown in FIG. 3B. Visualized mid portions 310-1 and 310-3 are shown as extending the width of the mid portion 310 of the image 300 such that the width of the mid portion 310 of the image 300 is wider than the mid portion 310 of the image 300 as shown in FIG. 3B. Visualized mid portions 310-1 and 310-3 can represent the double vision portion of the mid portion 310 of the image 300 when viewed in real time or in the real world and the eyes (e.g., eyes 205-1, 205-2 or 325-1, 325-2) are focused on the scene represented by the far portion 305 of the image 300.

FIG. 7B illustrates the scene represented by image 300 as visualized by the human visual system when the depth of focus is mid. In other words, FIG. 7B illustrates a visualization of the scene represented by image 300 when viewed in real time or in the real world and the eyes (e.g., eyes 205-1, 205-2 or 325-1, 325-2) are focused on the scene represented by the mid portion 310 of the scene represented by the image 300.

As shown in FIG. 7B, the mid portion 310 of the image 300 is as shown in FIG. 3B. In other words, the mid portion 310 of the image 300 is illustrated as behind the near portion 315 of the image 300 and in front of the far portion 305 of the image 300. The mid portion 310 of the image 300 shown in FIG. 7B is also the shape (e.g., a cross shaded rectangle) and size as shown in FIG. 3B. However, in FIG. 7B, the near portion 315 of the image 300 and the far portion 305 of the image 300 are shown as distorted when compared to the near portion 315 of the image 300 and the far portion 305 of the image 300 as shown in FIG. 3B. This is so, because the human visual system can only see clearly at one depth of focus.

As shown in FIG. 7B, the near portion 315 of the image 300 and the far portion 305 of the image 300 are shown as double vision portions. For example, the near portion 315 of the image 300 is split into three visualized near portions 315-1, 315-2 and 315-3. Visualized near portion 315-2 is shown as having the same shape and shading as the near portion 315 of the image 300 shown in FIG. 3B. However, visualized near portion 315-2 is shown as being narrower than the near portion 315 of the image 300 shown in FIG. 3B. Visualized near portions 315-1 and 315-3 are shown as having the same shape and a lighter shading compared to the near portion 315 of the image 300 shown in FIG. 3B. Visualized near portions 315-1 and 315-3 are shown as extending the width of the near portion 315 of the image 300 past the width of the mid portion 310 of the image 300 similar to the mid portion 310 of the image 300 as shown in FIG. 3B. Visualized near portions 315-1 and 315-3 can represent the double vision portion of the near portion 315 of the image 300 when viewed in real time or in the real world and the eyes (e.g., eyes 205-1, 205-2 or 325-1, 325-2) are focused on the scene represented by the mid portion 310 of the image 300.

For example, the far portion 305 of the image 300 is split into two visualized far portions 305-1 and 305-2. Visualized far portions 305-1 and 305-2 shown in FIG. 7B are shown as having the same shape (e.g., a star) and a lighter shading compared to the far portion 305 of the image 300 shown in FIG. 3B. Visualized far portions 305-1 and 305-2 can represent the double vision portion of the far portion 305 of the image 300 when viewed in real time or in the real world and the eyes (e.g., eyes 205-1, 205-2 or 325-1, 325-2) are focused on the scene represented by the mid portion 310 of the image 300.

FIG. 7C illustrates the scene represented by image 300 as visualized by the human visual system when the depth of focus is near. In other words, FIG. 7C illustrates a visualization of the scene represented by image 300 when viewed in real time or in the real world and the eyes (e.g., eyes 205-1, 205-2 or 325-1, 325-2) are focused on the scene represented by the near portion 315 of the scene represented by the image 300.

As shown in FIG. 7C, the near portion 315 of the image 300 is as shown in FIG. 3B. In other words, the near portion 315 of the image 300 is illustrated as in front of the mid portion 310 of the image 300 and in front of the far portion 305 of the image 300. The near portion 315 of the image 300 shown in FIG. 7C is also the shape (e.g., a dot shaded rectangle) and size as shown in FIG. 3B. However, in FIG. 7C, the mid portion 310 of the image 300 and the far portion 305 of the image 300 are shown as distorted when compared to the mid portion 310 of the image 300 and the far portion 305 of the image 300 as shown in FIG. 3B. This is so, because the human visual system can only see clearly at one depth of focus.

As shown in FIG. 7C, the mid portion 310 of the image 300 and the far portion 305 of the image 300 are shown as double vision portions. For example, the mid portion 310 of the image 300 is split into three visualized mid portions 310-1, 310-2 and 310-3. Visualized mid portion 310-2 is shown as having the same shape and shading as the mid portion 310 of the image 300 shown in FIG. 3B. However, visualized mid portion 310-2 is shown as being narrower than the mid portion 310 of the image 300 shown in FIG. 3B. Visualized mid portions 310-1 and 310-3 are shown as having the same shape and a lighter shading compared to the mid portion 310 of the image 300 shown in FIG. 3B. Visualized mid portions 310-1 and 310-3 are shown as extending the width of the mid portion 310 of the image 300 such that the width of the mid portion 310 of the image 300 is wider than the mid portion 310 of the image 300 as shown in FIG. 3B. Visualized mid portions 310-1 and 310-3 can represent the double vision portion of the mid portion 310 of the image 300 when viewed in real time or in the real world and the eyes (e.g., eyes 205-1, 205-2 or 325-1, 325-2) are focused on the scene represented by the near portion 315 of the image 300.

For example, the far portion 305 of the image 300 is split into two visualized far portions 305-1 and 305-2. Visualized far portions 305-1 and 305-2 shown in FIG. 7C are shown as having the same shape (e.g., a star) and a lighter shading compared to the far portion 305 of the image 300 shown in FIG. 3B. Visualized far portions 305-1 and 305-2 can represent the double vision portion of the far portion 305 of the image 300 when viewed in real time or in the real world and the eyes (e.g., eyes 205-1, 205-2 or 325-1, 325-2) are focused on the scene represented by the near portion 315 of the image 300.

The examples illustrated in FIGS. 7A, 7B and 7C can also be compared to each other. For example, the aforementioned double vision portions are indicated as having a larger distortion the further the depth of focus is from the visualization. For example, FIG. 7B shows the image 300 when focused on the scene represented by the mid portion 310 of the image 300 and FIG. 7C shows the image 300 when focused on the scene represented by the near portion 315 of the image 300. Accordingly, the depth of focus as compared to the scene represented by the far portion 305 of the image 300 is shown as further away in FIG. 7C than FIG. 7B. As such, the visualized far portions 305-1 and 305-2 shown in FIG. 7C and FIG. 7B are shown in different positions. For example, the visualized far portions 305-1 and 305-2 shown in FIG. 7B are closer together (e.g., less distorted) and substantially within the width of the mid portion 310 as compared to the visualized far portions 305-1 and 305-2 shown in FIG. 7C. A similar analysis can be done for the when the focus is on the scene represented by the mid portion 310 and the far portion 305 of the image 300.

Figure 8A:
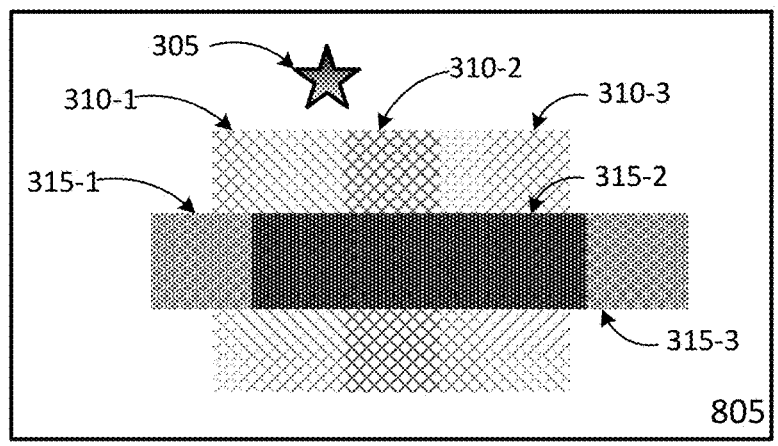
FIGS. 8A and 8B illustrate diagrams of combined images according to at least one example embodiment.
Figure 8B:
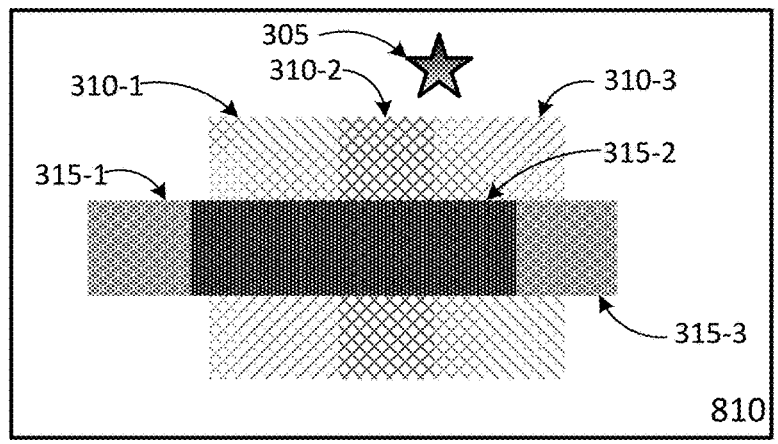

FIGS. 8A and 8B illustrate diagrams of combined images according to at least one example embodiment. FIG. 8A illustrates a combined image 805 based on combining image 300 as captured by camera 320-1 and 320-2. The combined image 805 is shown as combined at a focus depth based on the far portion 305 of the image 300. In other words, the combined image 805 is a combination of the image 300 from two different fields of view. As shown in FIG. 8A, the far portion 305 of the combined image 805 is substantially similar to the far portion 305 of the image 300 as shown in FIG. 3B. In other words, in FIG. 8A, the far portion 305 of the combined image 805 is illustrated as behind (and above for clarity) the near portion 315 and the mid portion 310. The far portion 305 of the combined image 805 is also the shape (e.g., a single shaded star) as shown in FIG. 3B. However, in FIG. 8A, the far portion 305 of the combined image 805 is shown shifted to the left as compared to the far portion 305 of the image 300 as shown in FIG. 3B. Alternatively, the near portion 315 and the mid portion 310 are shown as shifted to the right. Further, in FIG. 8A, the near portion 315 and the mid portion 310 are shown as distorted when compared to the near portion 315 of the image 300 and the mid portion 310 of the image 300 as shown in FIG. 3B.

As shown in FIG. 8A, the near portion 315 and the mid portion 310 are shown as double vision portions. For example, the near portion 315 is split into three near portions 315-1, 315-2 and 315-3. The near portion 315-2 of the combined image 805 is shown as having the same shape and shading (e.g., is not distorted) as the near portion 315 of the image 300 shown in FIG. 3B. However, the near portion 315-2 of the combined image 805 is shown as being narrower than the near portion 315 of the image 300 shown in FIG. 3B. The near portions 315-1 and 315-3 of the combined image 805 are shown as having the same shape and a lighter shading compared to the near portion 315 of the image 300 shown in FIG. 3B. The near portions 315-1 and 315-3 of the combined image 805 are shown as extending the width of the near portion 315 of the image 300 past the width of the mid portion 310 of the image 300 similar to the mid portion 310 of the image 300 as shown in FIG. 3B. The near portions 315-1 and 315-3 of the combined image 805 are shown as shifted to the right as compared to the near portion 315 of the image 300 shown in FIG. 3B.

For example, the mid portion 310 is split into three mid portions 310-1, 310-2 and 310-3. The mid portion 310-2 of the combined image 805 is shown as having the same shape and shading as the mid portion 310 of the image 300 shown in FIG. 3B. However, the mid portion 310-2 of the combined image 805 is shown as being narrower than the mid portion 310 of the image 300 shown in FIG. 3B. The mid portions 310-1 and 310-3 of the combined image 805 are shown as having the same shape and a lighter shading compared to the mid portion 310 of the image 300 shown in FIG. 3B. The mid portions 310-1 and 310-3 of the combined image 805 are shown as extending the width of the mid portion 310 of the image 300 such that the width of the mid portion 310 of the image 300 is wider than the mid portion 310 of the image 300 as shown in FIG. 3B. The mid portions 310-1 and 310-3 of the combined image 805 are shown as shifted to the right as compared to the near portion 315 of the image 300 shown in FIG. 3B with a shift that is slightly less than the shift of the near portions 315-1 and 315-3 of the combined image 805 (e.g., the near portion 315-2 of the combined image 805 extends past the right boundary of mid portion 310-2, which is different than that which is shown in FIG. 7A).

FIG. 8B illustrates a combined image 810 based on combining image 300 as captured by camera 320-2 and 320-3. The combined image 810 is shown as combined at a focus depth based on the far portion 305 of the image 300. In other words, the combined image 810 is a combination of the image 300 from two different fields of view. As shown in FIG. 8B, the far portion 305 of the combined image 810 is substantially similar to the far portion 305 of the image 300 as shown in FIG. 3B. In other words, in FIG. 8B, the far portion 305 of the combined image 810 is illustrated as behind (and above for clarity) the near portion 315 and the mid portion 310. The far portion 305 of the combined image 810 is also the shape (e.g., a single shaded star) as shown in FIG. 3B. However, in FIG. 8B, the far portion 305 of the combined image 805 is shown shifted to the right as compared to the far portion 305 of the image 300 as shown in FIG. 3B. Alternatively, the near portion 315 and the mid portion 310 are shown as shifted to the left. Further, in FIG. 8B, the near portion 315 and the mid portion 310 are shown as distorted when compared to the near portion 315 of the image 300 and the mid portion 310 of the image 300 as shown in FIG. 3B.

As shown in FIG. 8B, the near portion 315 and the mid portion 310 are shown as double vision portions. For example, the near portion 315 is split into three near portions 315-1, 315-2 and 315-3. The near portion 315-2 of the combined image 810 is shown as having the same shape and shading (e.g., is not distorted) as the near portion 315 of the image 300 shown in FIG. 3B. However, the near portion 315-2 of the combined image 810 is shown as being narrower than the near portion 315 of the image 300 shown in FIG. 3B. The near portions 315-1 and 315-3 of the combined image 810 are shown as having the same shape and a lighter shading compared to the near portion 315 of the image 300 shown in FIG. 3B. The near portions 315-1 and 315-3 of the combined image 810 are shown as extending the width of the near portion 315 of the image 300 past the width of the mid portion 310 of the image 300 similar to the mid portion 310 of the image 300 as shown in FIG. 3B. The near portions 315-1 and 315-3 of the combined image 810 are shown as shifted to the left as compared to the near portion 315 of the image 300 shown in FIG. 3B.

For example, the mid portion 310 is split into three mid portions 310-1, 310-2 and 310-3. The mid portion 310-2 of the combined image 810 is shown as having the same shape and shading as the mid portion 310 of the image 300 shown in FIG. 3B. However, the mid portion 310-2 of the combined image 810 is shown as being narrower than the mid portion 310 of the image 300 shown in FIG. 3B. The mid portions 310-1 and 310-3 of the combined image 810 are shown as having the same shape and a lighter shading compared to the mid portion 310 of the image 300 shown in FIG. 3B. The mid portions 310-1 and 310-3 of the combined image 810 are shown as extending the width of the mid portion 310 of the image 300 such that the width of the mid portion 310 of the image 300 is wider than the mid portion 310 of the image 300 as shown in FIG. 3B. The mid portions 310-1 and 310-3 of the combined image 810 are shown as shifted to the left as compared to the near portion 315 of the image 300 shown in FIG. 3B with a shift that is slightly less than the shift of the near portions 315-1 and 315-3 of the combined image 810 (e.g., the near portion 315-2 of the combined image 810 extends past the left boundary of mid portion 310-1, which is different than that which is shown in FIG. 7A).

In order to generate a combined image (e.g., combined image 805 and/or combined image 810) a processor (e.g., processor 210 executing a set of instructions) can shift a first image (e.g., as captured by camera 320-1) with respect to a second image (e.g., as captured by camera 320-2) captured at the same (or substantially the same) time as the first image until a portion of a combined image (e.g., the far portion 305) is sharp (e.g., the portion of the first image substantially overlaps the portion of the second image). In an example implementation, the first image is shifted a number of pixels based on a distance between the two cameras and an angle (e.g., C, see FIG. 13A). Alternatively, or in addition to, the processor can match a position of a portion of an image (e.g., the far portion 305) in a first image (e.g., as captured by camera 320-1) with a position of a same portion of an image (e.g., the far portion 305) in a second image (e.g., as captured by camera 320-2) captured at the same (or substantially the same) time as the first image. Then the first image can be shifted based on the matched position.

Then the first image and the second image can be combined (e.g., overlaid) with one another based on the shift. Further, a post processing may occur. For example, a color merging or adjustment may be performed such that the combined portion of the image has substantially the same color palette as the portion of the image in the first image and/or second image. For example, a color (or pixel data value) offset may be determined and applied across the combined image.

Figure 8C:
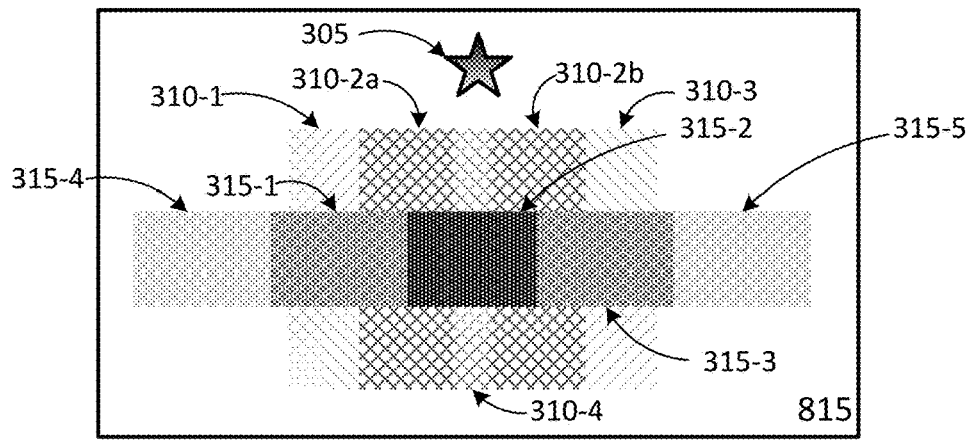
FIG. 8C illustrates a visualized image based on the combined images when displayed on a display of a HMD according to at least one example embodiment.

FIG. 8C illustrates a visualized image 815 when displayed (and viewed) on a display of a HMD according to at least one example embodiment. For example, combined image 805 could be displayed on display 105-L and combined image 810 could be displayed on display 105-R each of HMD 150 as shown in FIG. 1B. The visualized image 815 can be the image as perceived by the human visual system as visualized in the full binocular overlap visual field 1320 and/or the high resolution region of binocular overlapping visual field 1325 (see FIG. 13A). In other words, FIG. 8C illustrates a visualization of the scene represented by image 300 when rendered on and viewed through a HMD using combined images 805 and 810. Further, by using the combined images 805 and 810 a perceived 3D image is rendered without interpolating 3D images from captured 2D images.

As shown in FIG. 8C, the far portion 305 of the visualized image 815 is substantially similar to the far portion 305 of the image 300 as shown in FIG. 3B. In other words, the far portion 305 of the visualized image 815 is illustrated as behind (and above for clarity) the near portion 315 of the visualized image 815 and the mid portion 310 of the visualized image 815. The far portion 305 of the visualized image 815 is also the shape (e.g., a single shaded star) as the far portion 305 of the image 300 as shown in FIG. 3B. However, in FIG. 8C, the near portion 315 of the visualized image 815 and the mid portion 310 of the visualized image 815 are shown as distorted when compared to the near portion 315 of the image 300 and the mid portion 310 of the image 300 as shown in FIG. 3B. This is so, because the human visual system can only see clearly at one depth of focus.

As shown in FIG. 8C, the near portion 315 of the visualized image 815 and the mid portion 310 of the visualized image 815 are shown as triple vision portions. For example, the near portion 315 of the visualized image 815 is split into five visualized near portions 315-1, 315-2, 315-3, 315-4 and 315-5. Visualized near portion 315-2 is shown as having the same shape and shading as the near portion 315 of the image 300 shown in FIG. 3B. However, visualized near portion 315-2 is shown as being narrower than the near portion 315 of the image 300 shown in FIG. 3B. Visualized near portions 315-1 and 315-3 are shown as having the same shape and a lighter shading compared to the near portion 315 of the image 300 shown in FIG. 3B. Visualized near portions 315-4 and 315-5 are shown as having the same shape and a lighter shading compared to visualized near portions 315-1 and 315-3. Visualized near portions 315-1, 315-3, 315-4 and 315-5 are shown as extending the width of the near portion 315-2 of the visualized image 815 past the width of the mid portion 310 of the visualized image 815 similar to the mid portion 310 of the image 300 as shown in FIG. 3B. Visualized near portions 315-1, 315-3, 315-4 and 315-5 can represent the triple vision portion of the near portion 315 of the image 300 when viewed through a HMD using combined images 805 and 810 and the eyes (e.g., eyes 205-1, 205-2 or 325-1, 325-2) are focused on the far portion 305 of the image 300.

For example, the mid portion 310 of the visualized image 815 is split into five visualized mid portions 310-1, 310-2a, 310-2b, 310-3 and 310-4. Visualized mid portions 310-2a and 310-2b of the visualized image 815 are shown as having the same shape and shading as the mid portion 310 of the image 300 shown in FIG. 3B. However, visualized mid portions 310-2a and 310-2b are shown as having a distortive portion 310-4 between them, whereas the mid portion 310 of the image 300 shown in FIG. 3B is continuous. Visualized mid portions 310-1 and 310-3 of the visualized image 815 are shown as having the same shape and a lighter shading compared to the mid portion 310 of the image 300 shown in FIG. 3B. Visualized mid portions 310-1 and 310-3 of the visualized image 815 are shown as extending the width of the mid portion 310 of the image 300 such that the width of the mid portion 310 of the image 300 is wider than the mid portion 310 of the image 300 as shown in FIG. 3B. Visualized mid portions 310-1, 310-3 and 310-5 of the visualized image 815 can represent the triple vision portion of the mid portion 310 of the image 300 when viewed through a HMD using combined images 805 and 810 and the eyes (e.g., eyes 205-1, 205-2 or 325-1, 325-2) are focused on the far portion 305 of the image 300.

Figure 9A:
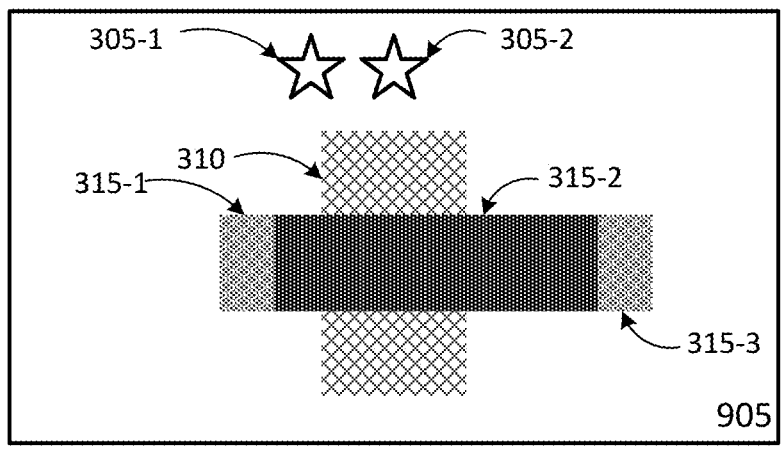
FIGS. 9A and 9B illustrate diagrams of combined images according to at least one example embodiment.
Figure 9B:
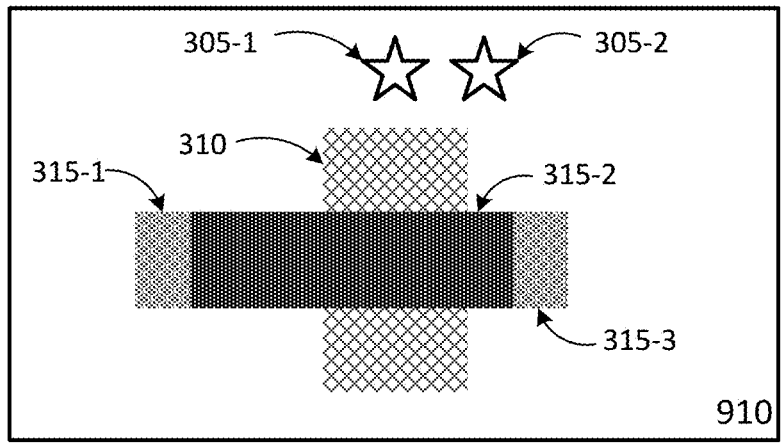

FIGS. 9A and 9B illustrate diagrams of combined images according to at least one example embodiment. FIG. 9A illustrates a combined image 905 based on combining image 300 as captured by camera 320-1 and 320-2. The combined image 905 is shown as combined at a focus depth based on the mid portion 310 of the image 300. In other words, the combined image 905 is a combination of the image 300 from two different fields of view. As shown in FIG. 9A, the mid portion 310 of the combined image 905 is substantially similar to the mid portion 310 of the image 300 as shown in FIG. 3B. In other words, in FIG. 9A, the mid portion 310 of the combined image 905 is illustrated as behind the near portion 315 and in front of the far portion 305. The mid portion 310 of the combined image 905 is also the shape (e.g., a cross shaded rectangle) and size as shown in FIG. 3B. However, in FIG. 9A, the mid portion 310 of the combined image 905 is shown shifted to the left as compared to the mid portion 310 of the image 300 as shown in FIG. 3B. Alternatively, the near portion 315 and the far portion 305 are shown as shifted to the right. Further, in FIG. 9A, the near portion 315 and the far portion 305 are shown as distorted when compared to the near portion 315 of the image 300 and the far portion 305 of the image 300 as shown in FIG. 3B.

As shown in FIG. 9A, the near portion 315 and the far portion 305 are shown as double vision portions. For example, the near portion 315 is split into three near portions 315-1, 315-2 and 315-3. The near portion 315-2 of the combined image 905 is shown as having the same shape and shading (e.g., is not distorted) as the near portion 315 of the image 300 shown in FIG. 3B. However, the near portion 315-2 of the combined image 905 is shown as being narrower than the near portion 315 of the image 300 shown in FIG. 3B. The near portions 315-1 and 315-3 of the combined image 905 are shown as having the same shape and a lighter shading compared to the near portion 315 of the image 300 shown in FIG. 3B. The near portions 315-1 and 315-3 of the combined image 905 are shown as extending the width of the near portion 315 of the image 300 past the width of the mid portion 310 of the image 300 similar to the mid portion 310 of the image 300 as shown in FIG. 3B. The near portions 315-1 and 315-3 of the combined image 905 are shown as shifted to the right as compared to the near portion 315 of the image 300 shown in FIG. 3B.

For example, the far portion 305 is split into two far portions 305-1 and 305-2. The far portions 305-1 and 305-2 shown in FIG. 9A are shown as having the same shape (e.g., a star) and a lighter shading compared to the far portion 305 of the image 300 shown in FIG. 3B. The far portions 305-1 and 305-2 of the combined image 905 are shown as shifted to the right as compared to the near portion 315 of the image 300 shown in FIG. 3B.

FIG. 9B illustrates a combined image 910 based on combining image 300 as captured by camera 320-2 and 320-3. The combined image 910 is shown as combined at a focus depth based on the mid portion 310 of the image 300. In other words, the combined image 910 is a combination of the image 300 from two different fields of view. As shown in FIG. 9B, the mid portion 310 of the combined image 910 is substantially similar to the mid portion 310 of the image 300 as shown in FIG. 3B. In other words, in FIG. 9B, the mid portion 310 of the combined image 910 is illustrated as behind the near portion 315 and in front of the far portion 305. The far portion 305 of the combined image 910 is also the shape (e.g., a cross shaded rectangle) and size as shown in FIG. 3B. However, in FIG. 9B, the mid portion 310 of the combined image 910 is shown shifted to the right as compared to the mid portion 310 of the image 300 as shown in FIG. 3B. Alternatively, the near portion 315 and the far portion 305 are shown as shifted to the left. Further, in FIG. 9B, the near portion 315 and the far portion 305 are shown as distorted when compared to the near portion 315 of the image 300 and the far portion 305 of the image 300 as shown in FIG. 3B.

As shown in FIG. 9B, the near portion 315 and the far portion 305 are shown as double vision portions. For example, the near portion 315 is split into three near portions 315-1, 315-2 and 315-3. The near portion 315-2 of the combined image 910 is shown as having the same shape and shading (e.g., is not distorted) as the near portion 315 of the image 300 shown in FIG. 3B. However, the near portion 315-2 of the combined image 910 is shown as being narrower than the near portion 315 of the image 300 shown in FIG. 3B. The near portions 315-1 and 315-3 of the combined image 910 are shown as having the same shape and a lighter shading compared to the near portion 315 of the image 300 shown in FIG. 3B. The near portions 315-1 and 315-3 of the combined image 910 are shown as extending the width of the near portion 315 of the image 300 past the width of the mid portion 310 of the image 300 similar to the mid portion 310 of the image 300 as shown in FIG. 3B. The near portions 315-1 and 315-3 of the combined image 910 are shown as shifted to the left as compared to the near portion 315 of the image 300 shown in FIG. 3B.

For example, the far portion 305 is split into two far portions 305-1 and 305-2. The far portions 305-1 and 305-2 shown in FIG. 9B are shown as having the same shape (e.g., a star) and a lighter shading compared to the far portion 305 of the image 300 shown in FIG. 3B. The far portions 305-1 and 305-2 of the combined image 910 are shown as shifted to the left as compared to the near portion 315 of the image 300 shown in FIG. 3B.

In order to generate a combined image (e.g., combined image 905 and/or combined image 910) a processor (e.g., processor 210 executing a set of instructions) can shift a first image (e.g., as captured by camera 320-1) with respect to a second image (e.g., as captured by camera 320-2) captured at the same (or substantially the same) time as the first image until a portion of a combined image (e.g., the mid portion 310) is sharp (e.g., the portion of the first image substantially overlaps the portion of the second image). In an example implementation, the first image is shifted a number of pixels based on a distance between the two cameras and an angle (e.g., C, see FIG. 2A). Alternatively, or in addition to, the processor can match a position of a portion of an image (e.g., the mid portion 310) in a first image (e.g., as captured by camera 320-1) with a position of a same portion of an image (e.g., the far portion 305) in a second image (e.g., as captured by camera 320-2) captured at the same (or substantially the same) time as the first image. Then the first image can be shifted based on the matched position.

Then the first image and the second image can be combined (e.g., overlaid) with one another based on the shift. Further, a post processing may occur. For example, a color merging or adjustment may be performed such that the combined portion of the image has substantially the same color palette as the portion of the image in the first image and/or second image. For example, a color (or pixel data value) offset may be determined and applied across the combined image.

Figure 9C:
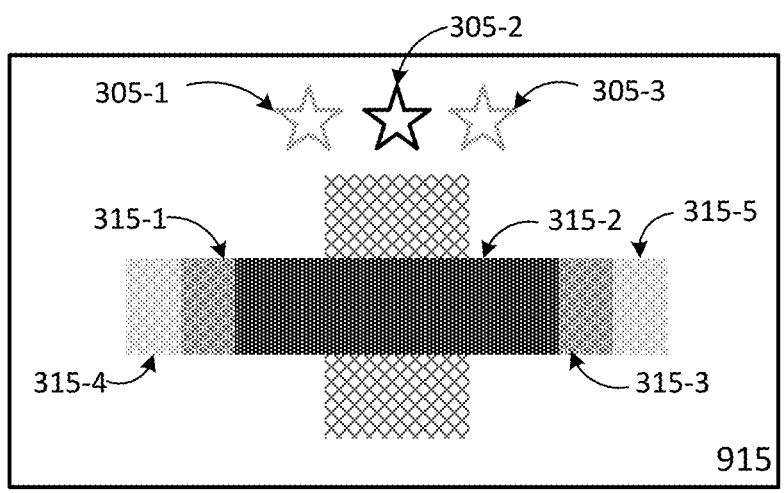
FIG. 9C illustrates a visualized image when displayed on a display of a HMD according to at least one example embodiment.

FIG. 9C illustrates a visualized image 915 when displayed (and viewed) on a display of a HMD according to at least one example embodiment. For example, combined image 905 could be displayed on display 105-L and combined image 910 could be displayed on display 105-R each of HMD 150 as shown in FIG. 1B. The visualized image 915 can be the image as perceived by the human visual system as visualized in the full binocular overlap visual field 1320 and/or the high resolution region of binocular overlapping visual field 1325 (see FIG. 13A). In other words, FIG. 9C illustrates a visualization of the scene represented by image 300 when rendered on and viewed through a HMD using combined images 905 and 910. Further, by using the combined images 905 and 910 a perceived 3D image is rendered without interpolating 3D images from captured 2D images.

As shown in FIG. 9C, the mid portion 310 of the visualized image 915 is substantially similar to the mid portion 310 of the image 300 as shown in FIG. 3B. In other words, in FIG. 9C, the mid portion 310 of the visualized image 915 is illustrated as behind the near portion 315 and in front of the far portion 305. The mid portion 310 of the visualized image 915 is also the shape (e.g., a cross shaded rectangle) and size as shown in FIG. 3B. However, in FIG. 9C, the near portion 315 of the visualized image 915 and the far portion 305 of the visualized image 915 are shown as distorted when compared to the near portion 315 of the image 300 and the far portion 305 of the image 300 as shown in FIG. 3B. This is so, because the human visual system can only see clearly at one depth of focus.

As shown in FIG. 9C, the near portion 315 of the visualized image 915 and the far portion 305 of the visualized image 915 are shown as triple vision portions. For example, the near portion 315 of the visualized image 915 is split into five visualized near portions 315-1, 315-2, 315-3, 315-4 and 315-5. Visualized near portion 315-2 is shown as having the same shape and shading as the near portion 315 of the image 300 shown in FIG. 3B. However, visualized near portion 315-2 is shown as being narrower than the near portion 315 of the image 300 shown in FIG. 3B. Visualized near portions 315-1 and 315-3 are shown as having the same shape and a lighter shading compared to the near portion 315 of the image 300 shown in FIG. 3B. Visualized near portions 315-4 and 315-5 are shown as having the same shape and a lighter shading compared to visualized near portions 315-1 and 315-3. Visualized near portions 315-1, 315-3, 315-4 and 315-5 are shown as extending the width of the near portion 315-2 of the visualized image 915 past the width of the mid portion 310 of the visualized image 915 similar to the mid portion 310 of the image 300 as shown in FIG. 3B. Visualized near portions 315-1, 315-3, 315-4 and 315-5 can represent the triple vision portion of the near portion 315 of the image 300 when viewed through a HMD using combined images 905 and 910 and the eyes (e.g., eyes 205-1, 205-2 or 325-1, 325-2) are focused on the far portion 305 of the image 300.

For example, the far portion 305 of the visualized image 915 is split into three visualized far portions 305-1, 305-2 and 305-3. Visualized far portion 305-2 of the visualized image 915 is shown as having the same shape and shading as the far portion 305 of the image 300 shown in FIG. 3B. However, visualized far portions 305-1 and 305-3 of the visualized image 915 are shown as having the same shape and a lighter shading compared to the far portion 305 of the image 300 shown in FIG. 3B. Visualized far portions 305-1 and 305-3 of the visualized image 915 can represent the triple vision portion of the far portion 305 of the image 300 when viewed through a HMD using combined images 905 and 910 and the eyes (e.g., eyes 205-1, 205-2 or 325-1, 325-2) are focused on the far portion 305 of the image 300.

Figure 10A:
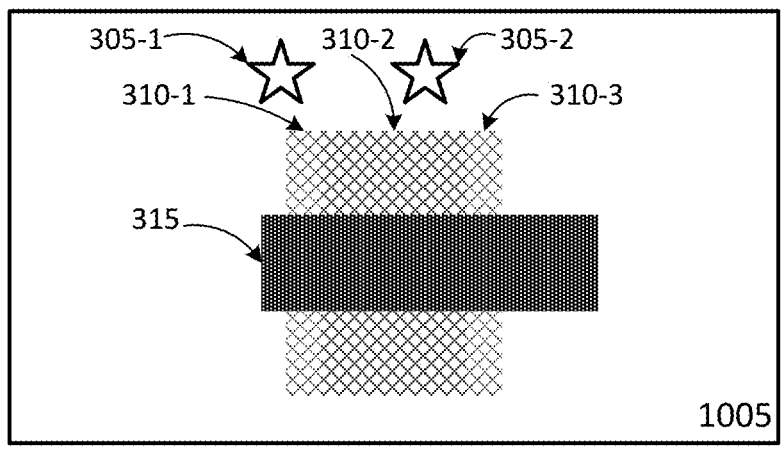
FIGS. 10A and 10B illustrate diagrams of combined images according to at least one example embodiment.
Figure 10B:
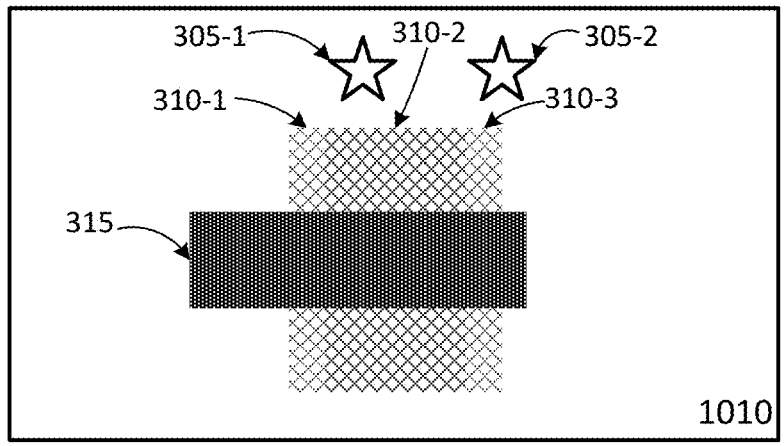

FIGS. 10A and 10B illustrate diagrams of combined images according to at least one example embodiment. FIG. 10A illustrates a combined image 1005 based on combining image 300 as captured by camera 320-1 and 320-2. The combined image 1005 is shown as combined at a focus depth based on the near portion 315 of the image 300. In other words, the combined image 1005 is a combination of the image 300 from two different fields of view. As shown in FIG. 10A, the near portion 315 of the combined image 1005 is substantially similar to the near portion 315 of the image 300 as shown in FIG. 3B. In other words, in FIG. 10A, the mid portion 315 of the combined image 1005 is illustrated as in front of the mid portion 310 and in front of the far portion 305. The near portion 315 of the combined image 1005 is also the shape (e.g., a dot shaded rectangle) and size as shown in FIG. 3B. However, in FIG. 10A, the near portion 315 of the combined image 1005 is shown shifted to the right as compared to the near portion 315 of the image 300 as shown in FIG. 3B. Alternatively, the mid portion 310 and the far portion 305 are shown as shifted to the left. Further, in FIG. 10A, the mid portion 310 and the far portion 305 are shown as distorted when compared to the mid portion 310 of the image 300 and the far portion 305 of the image 300 as shown in FIG. 3B.

As shown in FIG. 10A, the mid portion 310 and the far portion 305 are shown as double vision portions. For example, the mid portion 310 is split into three mid portions 310-1, 310-2 and 310-3. The mid portion 310-2 of the combined image 1005 is shown as having the same shape and shading as the mid portion 310 of the image 300 shown in FIG. 3B. However, the mid portion 310-2 of the combined image 1005 is shown as being narrower than the mid portion 310 of the image 300 shown in FIG. 3B. The mid portions 310-1 and 310-3 of the combined image 1005 are shown as having the same shape and a lighter shading compared to the mid portion 310 of the image 300 shown in FIG. 3B. The mid portions 310-1 and 310-3 of the combined image 1005 are shown as extending the width of the mid portion 310 of the image 300 such that the width of the mid portion 310 of the image 300 is wider than the mid portion 310 of the image 300 as shown in FIG. 3B. The mid portions 310-1, 310-2 and 310-3 of the combined image 1005 are shown as shifted to the left.

For example, the far portion 305 is split into two far portions 305-1 and 305-2. The far portions 305-1 and 305-2 shown in FIG. 10A are shown as having the same shape (e.g., a star) and a lighter shading compared to the far portion 305 of the image 300 shown in FIG. 3B. The far portions 305-1 and 305-2 of the combined image 1005 are shown as shifted to the left as compared to the near portion 315 of the image 300 shown in FIG. 3B.

FIG. 10B illustrates a combined image 1010 based on combining image 300 as captured by camera 320-2 and 320-3. The combined image 1010 is shown as combined at a focus depth based on the near portion 315 of the image 300. In other words, the combined image 1010 is a combination of the image 300 from two different fields of view. As shown in FIG. 10B, the near portion 315 of the combined image 1010 is substantially similar to the near portion 315 of the image 300 as shown in FIG. 3B. In other words, in FIG. 10B, the near portion 315 of the combined image 1010 is illustrated as in front of the mid portion 310 and in front of the far portion 305. The near portion 315 of the combined image 1010 is also the shape (e.g., a dot shaded rectangle) and size as shown in FIG. 3B. However, in FIG. 10B, the near portion 315 of the combined image 1010 is shown shifted to the left as compared to the near portion 315 of the image 300 as shown in FIG. 3B. Alternatively, the mid portion 310 and the far portion 305 are shown as shifted to the right. Further, in FIG. 10B, the mid portion 310 and the far portion 305 are shown as distorted when compared to the mid portion 310 of the image 300 and the far portion 305 of the image 300 as shown in FIG. 3B.

As shown in FIG. 10B, the mid portion 310 and the far portion 305 are shown as double vision portions. For example, the mid portion 310 is split into three mid portions 310-1, 310-2 and 310-3. The mid portion 310-2 of the combined image 1010 is shown as having the same shape and shading as the mid portion 310 of the image 300 shown in FIG. 3B. However, the mid portion 310-2 of the combined image 1010 is shown as being narrower than the mid portion 310 of the image 300 shown in FIG. 3B. The mid portions 310-1 and 310-3 of the combined image 1010 are shown as having the same shape and a lighter shading compared to the mid portion 310 of the image 300 shown in FIG. 3B. The mid portions 310-1 and 310-3 of the combined image 1010 are shown as extending the width of the mid portion 310 of the image 300 such that the width of the mid portion 310 of the image 300 is wider than the mid portion 310 of the image 300 as shown in FIG. 3B. The mid portions 310-1, 310-2 and 310-3 of the combined image 1005 are shown as shifted to the right.

For example, the far portion 305 is split into two far portions 305-1 and 305-2. The far portions 305-1 and 305-2 shown in FIG. 10B are shown as having the same shape (e.g., a star) and a lighter shading compared to the far portion 305 of the image 300 shown in FIG. 3B. The far portions 305-1 and 305-2 of the combined image 1010 are shown as shifted to the right as compared to the near portion 315 of the image 300 shown in FIG. 3B.

In order to generate a combined image (e.g., combined image 1005 and/or combined image 1010) a processor (e.g., processor 210 executing a set of instructions) can shift a first image (e.g., as captured by camera 320-1) with respect to a second image (e.g., as captured by camera 320-2) captured at the same (or substantially the same) time as the first image until a portion of a combined image (e.g., the near portion 315) is sharp (e.g., the portion of the first image substantially overlaps the portion of the second image). In an example implementation, the first image is shifted a number of pixels based on a distance between the two cameras and an angle (e.g., C, see FIG. 2A). Alternatively, or in addition to, the processor can match a position of a portion of an image (e.g., the near portion 315) in a first image (e.g., as captured by camera 320-1) with a position of a same portion of an image (e.g., the near portion 315) in a second image (e.g., as captured by camera 320-2) captured at the same (or substantially the same) time as the first image. Then the first image can be shifted based on the matched position.

Then the first image and the second image can be combined (e.g., overlaid) with one another based on the shift. Further, a post processing may occur. For example, a color merging or adjustment may be performed such that the combined portion of the image has substantially the same color palette as the portion of the image in the first image and/or second image. For example, a color (or pixel data value) offset may be determined and applied across the combined image.

Figure 10C:
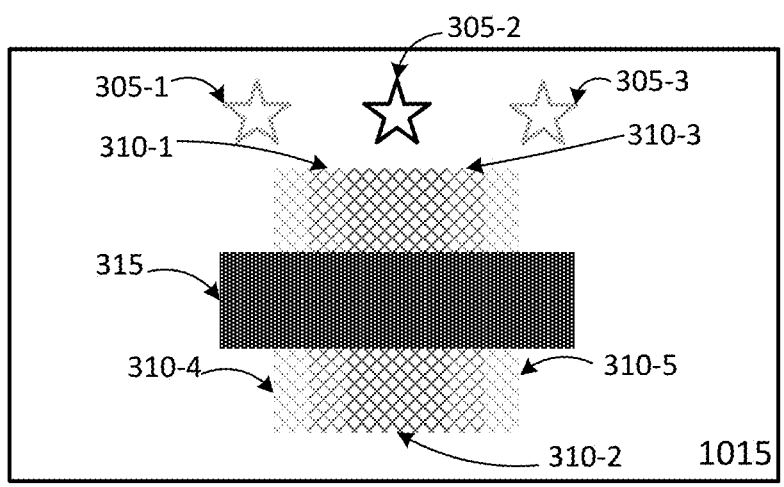
FIG. 10C illustrates a visualized image when displayed on a display of a HMD according to at least one example embodiment.

FIG. 10C illustrates a visualized image 1015 when displayed (and viewed) on a display of a HMD according to at least one example embodiment. For example, combined image 1005 could be displayed on display 105-L and combined image 1010 could be displayed on display 105-R each of HMD 150 as shown in FIG. 1B. The visualized image 1015 can be the image as perceived by the human visual system as visualized in the full binocular overlap visual field 1320 and/or the high resolution region of binocular overlapping visual field 1325 (see FIG. 13A). In other words, FIG. 10C illustrates a visualization of the scene represented by image 300 when rendered on and viewed through a HMD using combined images 1005 and 1010. Further, by using the combined images 1005 and 1010 a perceived 3D image is rendered without interpolating 3D images from captured 2D images.

As shown in FIG. 10C, the mid portion 310 of the visualized image 1015 is substantially similar to the near portion 315 of the image 300 as shown in FIG. 3B. In other words, in FIG. 10C, the near portion 315 of the visualized image 1015 is illustrated as in front of the mid portion 310 and in front of the far portion 305. The near portion 315 of the visualized image 1015 is also the shape (e.g., a dot shaded rectangle) and size as shown in FIG. 3B. However, in FIG. 10C, the mid portion 310 of the visualized image 1015 and the far portion 305 of the visualized image 915 are shown as distorted when compared to the near portion 315 of the image 300 and the far portion 305 of the image 300 as shown in FIG. 3B. This is so, because the human visual system can only see clearly at one depth of focus.

As shown in FIG. 10C, the mid portion 310 of the visualized image 1015 and the far portion 305 of the visualized image 1015 are shown as triple vision portions. For example, the mid portion 310 of the visualized image 1015 is split into five visualized mid portions 310-1, 310-2, 310-3, 310-4 and 310-5. Visualized mid portion 310-2 is shown as having the same shape and shading as the mid portion 310 of the image 300 shown in FIG. 3B. However, visualized mid portion 310-2 is shown as being narrower than the mid portion 310 of the image 300 shown in FIG. 3B. Visualized mid portions 310-1 and 310-3 are shown as having the same shape and a lighter shading compared to the near portion 315 of the image 300 shown in FIG. 3B. Visualized mid portions 310-4 and 310-5 are shown as having the same shape and a lighter shading compared to visualized mid portions 310-1 and 310-3. Visualized mid portions 310-1, 310-3, 310-4 and 310-5 are shown as extending the width of the mid portion 310-2 of the visualized image 915 past the width of the mid portion 310 of the visualized image 915 similar to the mid portion 310 of the image 300 as shown in FIG. 3B. Visualized mid portions 310-1, 310-3, 310-4 and 310-5 can represent the triple vision portion of the near portion 315 of the image 300 when viewed through a HMD using combined images 1005 and 1010 and the eyes (e.g., eyes 205-1, 205-2 or 325-1, 325-2) are focused on the near portion 315 of the image 300.

For example, the far portion 305 of the visualized image 1015 is split into three visualized far portions 305-1, 305-2 and 305-3. Visualized far portion 305-2 of the visualized image 1015 is shown as having the same shape and shading as the far portion 305 of the image 300 shown in FIG. 3B. However, visualized far portions 305-1 and 305-3 of the visualized image 1015 are shown as having the same shape and a lighter shading compared to the far portion 305 of the image 300 shown in FIG. 3B. Visualized far portions 305-1 and 305-3 of the visualized image 915 can represent the triple vision portion of the far portion 305 of the image 300 when viewed through a HMD using combined images 1005 and 1010 and the eyes (e.g., eyes 205-1, 205-2 or 325-1, 325-2) are focused on the near portion 315 of the image 300.

FIGS. 11A and 11B illustrate diagrams of a side by side comparison of visualized images at a far depth of view according to at least one example embodiment. The visualized image 300 illustrated in FIG. 11A is the same visualized image 300 illustrated in FIG. 7A. Accordingly, the visualized image 300 illustrated in FIG. 11A is described above with regard to FIG. 7A. The visualized image 815 illustrated in FIG. 11B is the same visualized image 815 illustrated in FIG. 8C. Accordingly, the visualized image 815 illustrated in FIG. 11B is described above with regard to FIG. 8C. The visualized image 300 illustrated in FIG. 11A can correspond to what the human visual system would actually see when looking at the scene corresponding to image 300 shown in FIG. 3B. The visualized image 815 illustrated in FIG. 11B can correspond to what the human visual system would actually see when viewing a 3D image corresponding to image 300 shown in FIG. 3B rendered on an HMD using combined images 805 and 810 according to an example implementation.

Comparing the visualized image 300 illustrated in FIG. 11A with the visualized image 815 illustrated in FIG. 11B, the portion of the visualized images at the focal depth is substantially the same. In other words, the far portion 305 of the image 300 shown in FIG. 11A is substantially the same as the far portion 305 of the image 815 shown in FIG. 11B. The mid portion 310 and the near portion 315 of the image 300 shown in FIG. 11A are different than the mid portion 310 and the near portion 315 of the image 815 shown in FIG. 11B. For example, the mid portion 310 and the near portion 315 of the image 300 shown in FIG. 11A are doubled and the mid portion 310 and the near portion 315 of the image 815 shown in FIG. 11B are tripled. The difference between the visualized image 300 shown in FIG. 11A and the rendered visualized image 815 shown in FIG. 11B is acceptable, because the human visual system can only see clearly at one depth of focus.

FIGS. 11C and 11D illustrate diagrams of a side by side comparison of visualized images at a mid depth of view according to at least one example embodiment. The visualized image 300 illustrated in FIG. 11C is the same visualized image 300 illustrated in FIG. 7B. Accordingly, the visualized image 300 illustrated in FIG. 11C is described above with regard to FIG. 7B. The visualized image 915 illustrated in FIG. 11D is the same visualized image 915 illustrated in FIG. 9C. Accordingly, the visualized image 915 illustrated in FIG. 11D is described above with regard to FIG. 9C. The visualized image 300 illustrated in FIG. 11C can correspond to what the human visual system would actually see when looking at the scene corresponding to image 300 shown in FIG. 3B. The visualized image 915 illustrated in FIG. 11D can correspond to what the human visual system would actually see when viewing a 3D image corresponding to image 300 shown in FIG. 3B rendered on an HMD using combined images 905 and 910 according to an example implementation.

Comparing the visualized image 300 illustrated in FIG. 11C with the visualized image 915 illustrated in FIG. 11D, the portion of the visualized images at the focal depth is substantially the same. In other words, the mid portion 310 of the image 300 shown in FIG. 11C is substantially the same as the mid portion 310 of the image 915 shown in FIG. 11D. The far portion 305 and the near portion 315 of the image 300 shown in FIG. 11C are different than the far portion 305 and the near portion 315 of the image 915 shown in FIG. 11D. For example, the far portion 305 and the near portion 315 of the image 300 shown in FIG. 11C are doubled and the far portion 305 and the near portion 315 of the image 915 shown in FIG. 11D are tripled. The difference between the visualized image 300 shown in FIG. 11C and the rendered visualized image 915 shown in FIG. 11D is acceptable, because the human visual system can only see clearly at one depth of focus.

FIGS. 11E and 11F illustrate diagrams of a side by side comparison of visualized images at a near depth of view according to at least one example embodiment. The visualized image 300 illustrated in FIG. 11E is the same visualized image 300 illustrated in FIG. 7C. Accordingly, the visualized image 300 illustrated in FIG. 11E is described above with regard to FIG. 7C. The visualized image 1015 illustrated in FIG. 11F is the same visualized image 1015 illustrated in FIG. 10C. Accordingly, the visualized image 1015 illustrated in FIG. 11F is described above with regard to FIG. 10C. The visualized image 300 illustrated in FIG. 11E can correspond to what the human visual system would actually see when looking at the scene corresponding to image 300 shown in FIG. 3B. The visualized image 1015 illustrated in FIG. 11F can correspond to what the human visual system would actually see when viewing a 3D image corresponding to image 300 shown in FIG. 3B rendered on an HMD using combined images 1005 and 1010 according to an example implementation.

Comparing the visualized image 300 illustrated in FIG. 11E with the visualized image 1015 illustrated in FIG. 11F, the portion of the visualized images at the focal depth is substantially the same. In other words, the near portion 315 of the image 300 shown in FIG. 11E is substantially the same as the near portion 315 of the image 1015 shown in FIG. 11F. The far portion 305 and the mid portion 310 of the image 300 shown in FIG. 11E are different than the far portion 305 and the mid portion 310 of the image 1015 shown in FIG. 11F. For example, the far portion 305 and the mid portion 310 of the image 300 shown in FIG. 11E are doubled and the far portion 305 and the mid portion 310 of the image 1015 shown in FIG. 11F are tripled. The difference between the visualized image 300 shown in FIG. 11E and the rendered visualized image 1015 shown in FIG. 11F is acceptable, because the human visual system can only see clearly at one depth of focus.

Figure 12A:
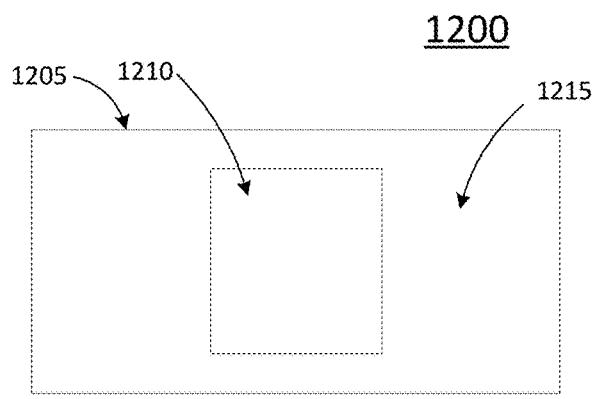
FIGS. 12A and 12B illustrate block diagrams of a head mounted display (HMD) according to at least one example embodiment.
Figure 12B:
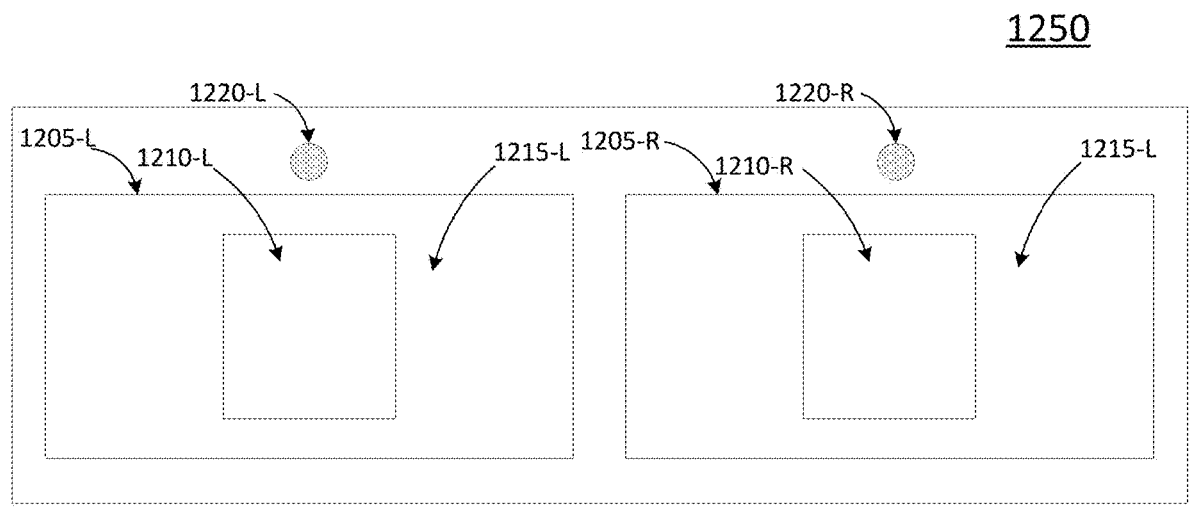

FIG. 12A illustrates a block diagram of a head mounted display (HMD) according to at least one example embodiment. As shown in FIG. 12A, the HMD 1200 includes a display 1205, a first portion of the display 1210 and a second portion of the display 1215. The first portion of the display 1210 can be a portion of the display 1205 on which an eye is focused or the field of view of a user of the HMD 1200. The second portion of the display 1215 can be a portion of the display 1205 peripheral to the focus of the eye or the periphery view of a user of the HMD 1200.

According to example embodiments, a 2D image and/or 2D frame of a video can be chosen for display on each display of a HMD based on tracking a field of view and depth of view of an eye using an eye tracking sensor in order to render 3D images and/or 3D video. As a result, the user of the HMD has a 3D experience without interpolating 3D images from captured 2D images.

FIG. 12B illustrates a block diagram of a head mounted display (HMD) according to at least one example embodiment. As shown in FIG. 12B, the HMD 1250 includes a first display 1205-L, a second display 1205-R, a first eye tracking sensor 1220-L and a second eye tracking sensor 1220-R. The first display 1205-L can include a first portion of the display 1210-L and a second portion of the display 1215-L. The first portion of the display 1210-L can be a portion of the first display 1205-L on which an eye is focused or the field of view of a user of the HMD 1250. The second portion of the display 1215-L can be a portion of the first display 1205-L peripheral to the focus of the eye or the periphery view of a user of the HMD 1250. The second display 1205-R can include a first portion of the display 1210-R and a second portion of the display 1215-R. The first portion of the display 1210-R can be a portion of the second display 1205-R on which an eye is focused or the field of view of a user of the HMD 1250. The second portion of the display 1215-R can be a portion of the second display 1205-R peripheral to the focus of the eye or the periphery view of a user of the HMD 1250.

The first portion of the display 1210-L of the first display 1205-L and the first portion of the display 1210-R of the second display 1205-R can be configured to display images and/or video data in a field of vision associated with a high resolution region of binocular overlap (described in more detail below). The second portion of the display 1215-L of the first display 1205-L and the second portion of the display 1215-R of the second display 1205-R may be configured to display images and/or video in a field of vision outside of, or peripheral to, the high resolution region of binocular overlap, including a further region of binocular overlap including a lower resolution. The first display 1205-L can be associated with a left eye and can be configured to display a left eye image in a 3D image or video. The second display 1205-R can be associated with a right eye and can be configured to display a right eye image in the 3D image or video. In an alternative embodiment, the first display 1205-L and the second display 1205-R are formed from one integral display panel capable of showing an image that is partitioned into two parts comprising left and right images.

The first eye tracking sensor 1220-L and the second eye tracking sensor 1220-R can be configured to track a position of a corresponding eye. The first eye tracking sensor 1220-L and the second eye tracking sensor 1220-R can be a camera, an infrared sensor, a combination thereof and/or the like. In an example implementation, the first eye tracking sensor 1220-L and the second eye tracking sensor 1220-R can be configured to project a low powered infrared light into a user's eye. Then, the reflected infrared light can be detected and a measurement of the reflected infrared light (e.g., as a Perkinje image) can be used to determine an eye's position. In another example implementation, a direction of gaze can be determined by locating the pupil relative to the rest of the eye under ambient light conditions. The first eye tracking sensor 1220-L and the second eye tracking sensor 1220-R can measure the absolute direction of the user's gaze relative to a point on the HMD and/or an angular displacement of the pupil upon each eye movement.

In an example implementation, the first eye tracking sensor 1220-L and the second eye tracking sensor 1220-R can be used to determine a direction of gaze (also referred to as view perspective in this disclosure) and a depth of gaze of a user of the HMD. The direction of gaze and the depth of gaze can be used to determine an image to be displayed on each of the first display 1205-L and the second display 1205-R.

Figure 13A:
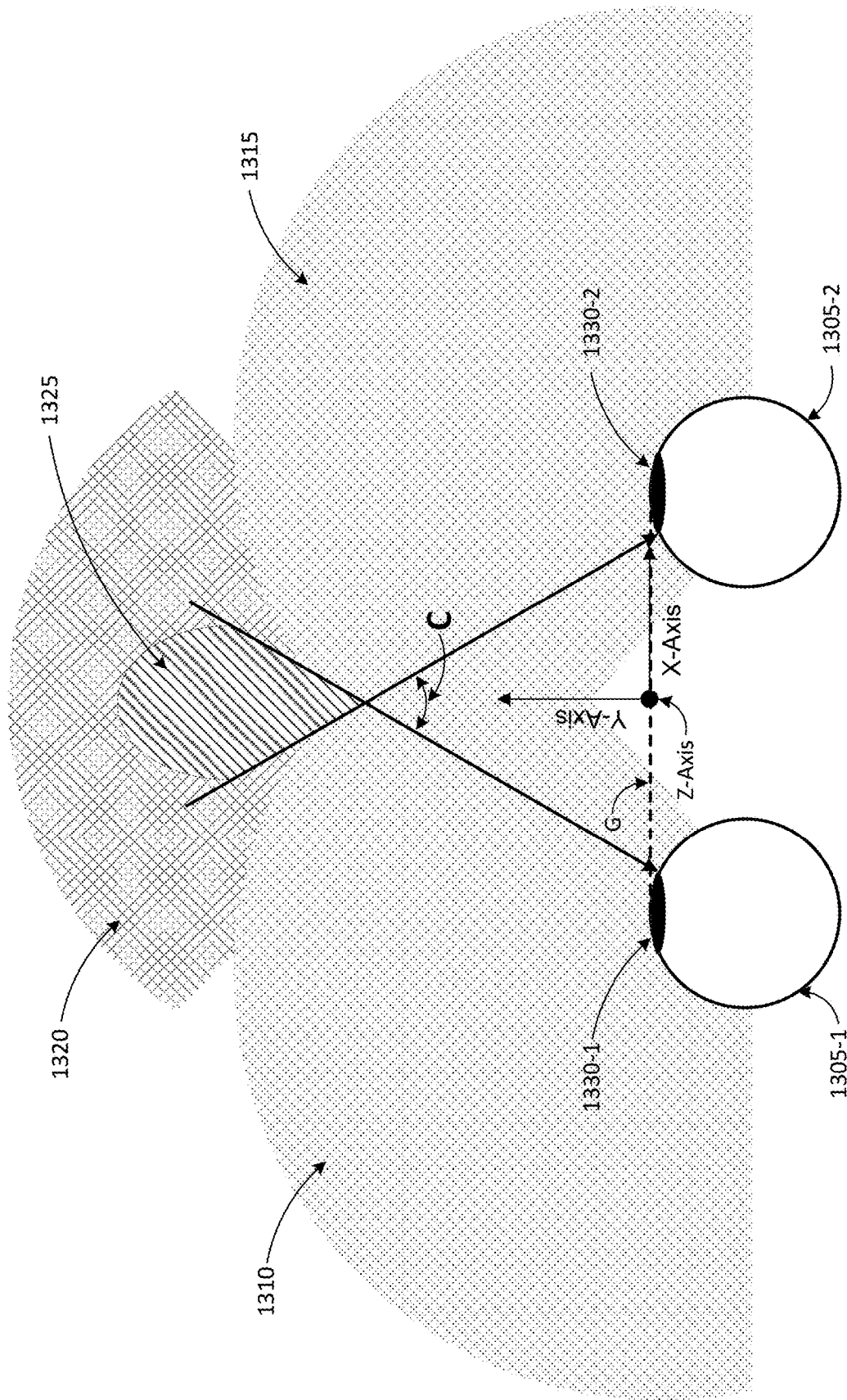
FIG. 13A illustrates a schematic representation of visual fields.
Figure 13B:
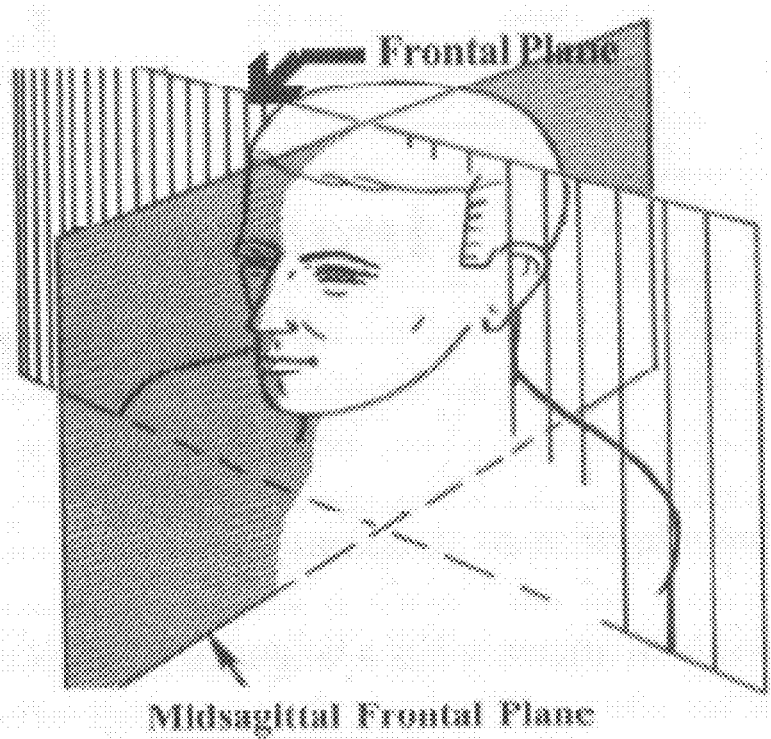
FIG. 13B illustrates the frontal plane and the midsagittal frontal plane.
Figure 13C:
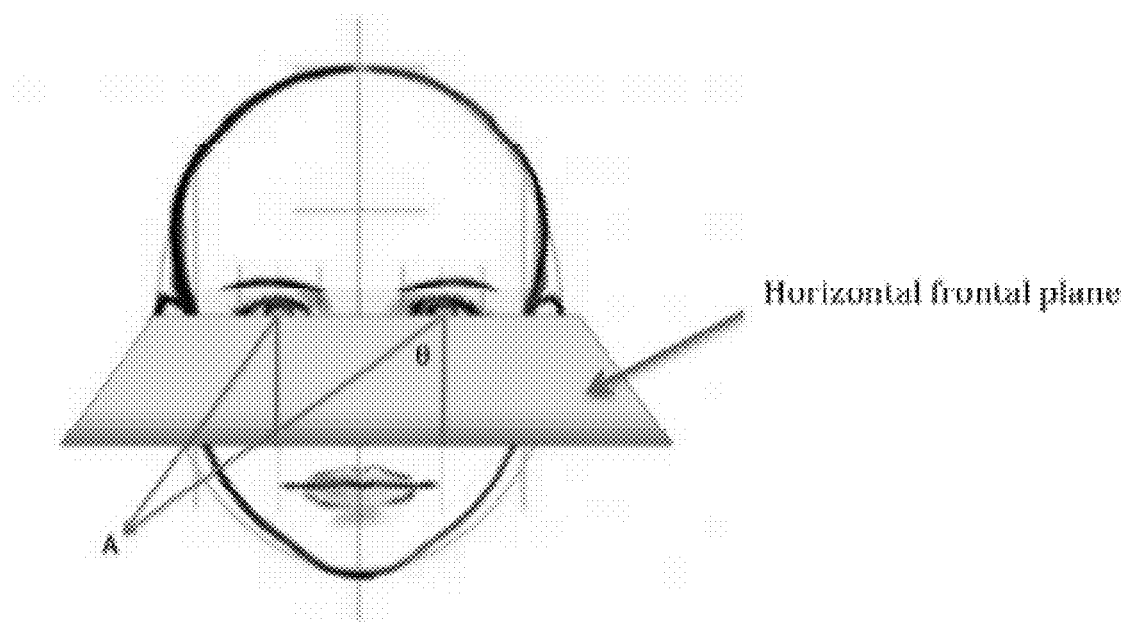
FIG. 13C illustrates a plane orthogonal to the frontal planes that bisects the eyes. Also shown are the gaze vectors from the eyes to a point A.

FIG. 13A illustrates a schematic representation from a top view of horizontal visual fields. As shown in FIG. 13A, eyes 1305-1, 1305-2 (e.g., human eyes), including pupils 1330-1, 1330-2, can visually perceive a left visual field 1310 and a right visual field 1315. Within the left visual field 1310 and the right visual field 1315, the eyes 1305-1, 1305-2 can visually perceive a full binocular overlap visual field 1320 which may be as large as 120 deg. A sub-region of full binocular overlap can be referred to as the high resolution region of binocular overlapping visual field 1325. As shown in FIG. 13B (and throughout this description), a vertical plane which hereinafter the midsagittal frontal plane bisects the head between the eyes, and a vertical plane that hereinafter the vertical frontal plane intersects the head orthogonal to the midsagittal plane at a position that bisects the eyes 1305-1 and 1305-2. FIG. 13C shows a horizontal plane that extends in a direction left and right (or horizontally) with respect to the eyes 1305-1, 1305-2 and that also bisects the eyes. The plane in FIG. 13C may be called the horizontal frontal plane. The three planes defined in FIGS. 13B and 13C can intersect at the midpoint of a line segment extending from the center of the left eye to the center of the right eye.

The fovea is the central portion of the retina of each of the eyes 1305-1, 1305-2 that perceives the highest resolution. The direction of gaze (illustrated by vector G parallel to the midsagittal plane) may be defined by a vector from the center of the fovea through the center of the pupil. Neither eye 1305-1 nor eye 1305-2 turns or rotates sufficiently to allow the direction of gaze to scan the full horizontal visual field 1310 or 1315. Therefore, imagery beyond the turning limit of the eyes 1305-1, 1305-2 may not be viewed by the fovea (although such imagery will be viewed by other parts of the retina).

It should be noted that although the fovea subtends only a small arc, the rotation of the eyes can extend the range of angles over which a display should match foveal resolution. When the user's eyes move and the direction of gaze changes, resolution matching the fovea is desirable over the range of comfortable gaze scanning. The range of comfortable gaze scanning is approximately 15 degrees in any direction with respect to vector G in FIG. 13A. The gaze can scan over larger angles with progressively more discomfort as the scan angle increases beyond 15 degrees from vector G.

In an example implementation of an HMD (while referring to FIG. 13C), all horizontal angles (e.g., angles along the horizontal frontal plane such as θ) can be measured (e.g., using the first eye tracking sensor 1220-L and the second eye tracking sensor 1220-R) with respect to the sagittal frontal plane (e.g., the plane of head symmetry centered between the eyes). The left visual field 1310 and the right visual field 1315 regions represent the visual fields of the left and right eyes that can be supplied images with partial binocular overlap that can be as much as 120 degrees per eye (e.g., the full binocular overlap visual field 1320 region, matching the overlap in the human visual system). The high resolution region of binocular overlap visual field 1325 can be supplied by left and right displays (e.g., display 105-L and display 105-R).

As such, the eyes 1305-1, 1305-2 can visualize a 3D image based on selecting images projected onto (or displayed by) left and right displays representing the visual fields of the left and right eyes in the high resolution region of binocular overlap visual field 1325 (and to some extent the full binocular overlap visual field 1320 region). In other words, selecting images for display in the full binocular overlap visual field 1320 region can match the overlap in the human visual system resulting in the human visual system visualize a 3D image and/or 3D video. As discussed in more detail below, the depth of gaze can be used to more realistically represent the human visual system.

According to an example implementation, an image for projection on a display for each eye can be based on direction of gaze shown in relation to point A and angle θ shown in FIG. 13C. Each image can then be modified by a depth of vision based on angle C shown in FIG. 13A. For example, point A, angle θ and angle C can be determined based on measurements captured using the first eye tracking sensor 1220-L and the second eye tracking sensor 1220-R. Point A, angle θ and/or angle C can be used to determine the field of view and/or the depth of view discussed above. For example, angle C can indicate a depth of view and point A in combination with angle θ can indicate a field of view.

Figure 14:
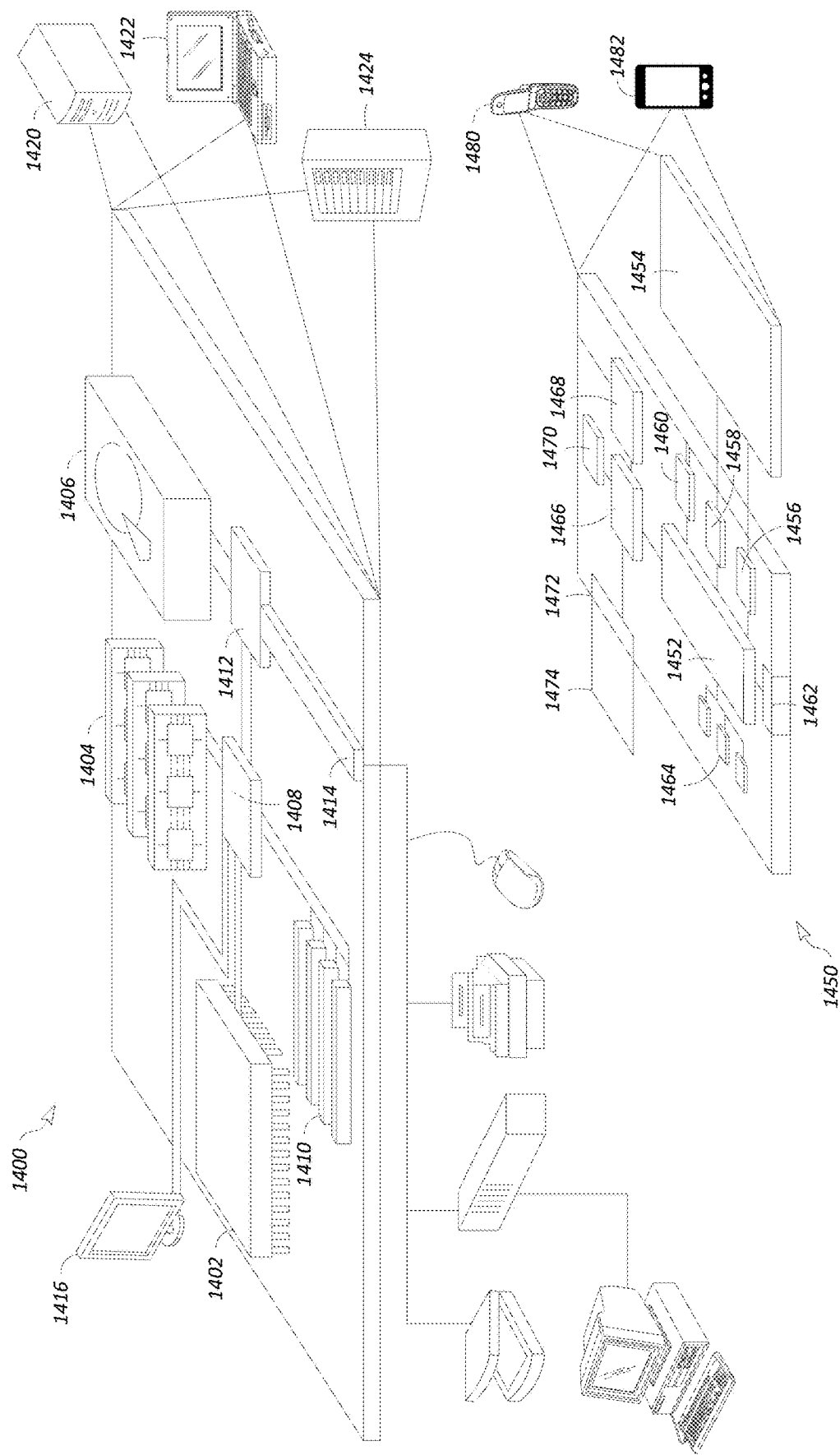
FIG. 14 illustrates an example of a computer device and a mobile computer device.

FIG. 14 shows an example of a computer device 1400 and a mobile computer device 1450, which may be used with the techniques described here. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a volatile memory unit or units. In another implementation, the memory 1404 is a non-volatile memory unit or units. The memory 1404 may also be another form of computer-readable medium, such as a magnetic or optical disk.

The storage device 1406 is capable of providing mass storage for the computing device 1400. In one implementation, the storage device 1406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of functions is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can execute instructions within the computing device 1450, including instructions stored in the memory 1464. The processor may be implemented as a chipset of chips that include separate and multiple analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD (Thin-Film-Transistor Liquid Crystal Display) or an OLED (Organic Light Emitting Diode) display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provide in communication with processor 1452, to enable near area communication of device 1450 with other devices. External interface 1462 may provide, for example, for wired communication in some implementations, or for wireless communication in other implementations, and multiple interfaces may also be used.

The memory 1464 stores information within the computing device 1450. The memory 1464 can be implemented as one or more of a computer-readable medium or media, a volatile memory unit or units, or a non-volatile memory unit or units. Expansion memory 1474 may also be provided and connected to device 1450 through expansion interface 1472, which may include, for example, a SIMM (Single In Line Memory Module) card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, or memory on processor 1452, that may be received, for example, over transceiver 1468 or external interface 1462.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, GPS (Global Positioning System) receiver module 1470 may provide additional navigation- and location-related wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smart phone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
    receiving an indication of a field of view associated with a three-dimensional (3D) image being displayed on a head mount display (HMD);
    receiving an indication of a depth of view as a focal depth detected on the HMD when displaying the 3D image being displayed on the HMD;
    selecting a first right eye image as an image captured by a first camera positioned to the right of a right eye position and a second right eye image as an image captured by a second camera positioned to the left of the right eye position, the right eye position being based on the field of view;
    combining the first right eye image and the second right eye image by overlaying the second right eye image on the first right eye image;
    in response to receiving the indication of the depth of view, shifting the second right eye image horizontally with respect to the first right eye image until a portion of the second right eye image overlaps at least a portion of the first right eye image to match the depth of view;
    selecting a first left eye image obtained from the left of a left eye position and a second left eye image obtained from the right of the left eye position, the left eye position being based on the field of view; and
    combining the first left eye image and the second left eye image by overlaying the second left eye image on the first left eye image; and
    in response to receiving the indication of the depth of view, shifting the second left eye image horizontally with respect to the first left eye image until a portion of the second left eye image overlaps at least a portion of the first left eye image to match the depth of view.

2. The method of claim 1, wherein selecting of the first left eye image and of the second left eye image include:
    determining, a left eye position of a user of the HMD;
    selecting the first left eye image as an image taken by a first camera positioned to the right of the left eye position; and
    selecting the second left eye image as an image taken by a second camera positioned to the left of the left eye position.

3. The method of claim 1, further comprising:
    selecting additional left eye images and additional right eye images;
    overlaying at least two of the additional left eye images; and
    in response to receiving the indication of the depth of view, shifting the at least two additional left eye images until a portion of each of the at least two left eye images include an overlapped portion that match the depth of view;
    overlaying at least two of the additional right eye images; and
    in response to receiving the indication of the depth of view, shifting the at least two additional right eye images until a portion of each of the at least two right eye images include an overlapped portion that match the depth of view.

4. The method of claim 1, wherein the combining of the first right eye image and the second right eye image includes shifting the first right eye image with respect to the second right eye image until at least a portion of a combined image, based on the depth of view, is undistorted.

5. The method of claim 1, wherein the combining of the first right eye image and the second right eye image includes shifting both the first right eye image and the second right eye image toward the center of the field of view until a portion of a combined image, based on the depth of view, is undistorted.

6. The method of claim 1, wherein the combining of the first right eye image and the second right eye image includes color merging such that a portion of the combined image has a same color palette as a corresponding portion of at least one of the first right eye image and the second right eye image.

7. The method of claim 1, wherein the combining of the first right eye image and the second right eye image includes color merging using a color offset based on a weighted offset associated with a camera distance from the center of the field of view.

8. The method of claim 1, wherein:
combining and shifting of the first right eye image and the second right eye image and combining and shifting the first left eye image and the second left eye image is performed without optical flow interpolation.

9. The method of claim 1, wherein the combining of the first left eye image and the second left eye image includes shifting the first left eye image with respect to the second left eye image until a portion of a combined image, based on the depth of view, is sharp.

10. The method of claim 1, wherein the combining of the first left eye image and the second left eye image includes shifting both the first left eye image and the second left eye image toward the center of the field of view until a portion of a combined image, based on the depth of view, is sharp.

11. The method of claim 1, wherein the combining of the first left eye image and the second left eye image includes color merging the combined image such that a portion of the combined image has a same color palette as a corresponding portion of at least one of the first left eye image and the second left eye image.

12. The method of claim 1, wherein the combining of the first left eye image and the second left eye image includes color merging the combined image using a color offset based on a weighted offset associated with a camera distance from the center of the field of view.

13. A method comprising:
streaming a three-dimensional (3D) video to a head mount display (HMD), each frame of the 3D video including a left eye image and a right eye image; and
generating a subsequent frame includes:
determining a field of view associated with the 3D video;
determining a depth of view as a focal depth detected on the HMD when displaying the 3D video;
selecting a first right eye image obtained from the left of a right eye position and a second right eye image, obtained from the right of the right eye position the right eye position being based on the field of view;
overlaying the second right eye image on the first right eye image;
in response to receiving the indication of the depth of view, shifting the second right eye image horizontally with respect to the first right eye image until a portion of the second right eye image overlaps at least a portion of the first right eye image to match the depth of view;
selecting a first left eye image as an image captured by a first camera positioned to the right of a left eye position and a second left eye image as an image captured by a second camera positioned to the left of the left eye position, the left eye position being based on the field of view;
overlaying the second left eye image on the first left eye image; and
in response to receiving the indication of the depth of view, shifting the second left eye image horizontally with respect to the first left eye image until a portion of the second left eye image overlaps at least a portion of the first left eye image to match the depth of view.

14. The method of claim 13, wherein selecting of the first right eye image and of the second right eye image includes:
determining a right eye position of a user of the HMD, selecting the first right eye image as an image taken by a first camera positioned to the right of the right eye position, and
selecting the second right eye image as an image taken by a second camera positioned to the left of the right eye position.

15. The method of claim 13, wherein the first right eye image, the second right eye image, the first left eye image and the second left eye image are selected from a plurality of images captured at the same moment in time.

16. The method of claim 13, wherein the combining of the first right eye image and the second right eye image includes shifting the first right eye image with respect to the second right eye image until a portion of a combined image, based on the depth of view, is undistorted, and the combining of the first left eye image and the second left eye image includes shifting the first left eye image with respect to the second left eye image until a portion of a combined image, based on the depth of view, is undistorted.

17. The method of claim 13, wherein the combining of the first right eye image and the second right eye image includes shifting both the first right eye image and the second right eye image toward the center of the field of view until a portion of a combined image, based on the depth of view, is undistorted, and
the combining of the first left eye image and the second left eye image includes shifting both the first left eye image and the second left eye image toward the center of the field of view until a portion of a combined image, based on the depth of view, is undistorted.

18. The method of claim 13, wherein the combining of the first left eye image and the second left eye image includes color merging the combined image.

19. A non-transitory computer-readable storage medium having stored thereon computer executable program code which, when executed on a computer system, causes the computer system to perform steps comprising:
receiving an indication of a field of view associated with a three-dimensional (3D) image being displayed on a head mount display (HMD);
receiving an indication of a depth of view as a focal depth of a user of the HMD viewing the 3D image being displayed on the HMD;
selecting a first right eye image as an image captured by a first camera positioned to the right of a right eye position and a second right eye image as an image captured by a second camera positioned to the left of the right eye position, the right eye position being based on the field of view;
overlaying the second right eye image on the first right eye image;
in response to receiving the indication of the depth of view, shifting the second right eye image horizontally with respect to the first right eye image until a portion of the second right eye image overlaps at least a portion of the first right eye image to match the depth of view;

selecting a first left eye image obtained from the left of a left eye position and a second left eye image obtained from the right of the left eye position, the left eye position being based on the field of view;

overlaying the second left eye image on the first left eye image; and in response to receiving the indication of the depth of view, shifting the second left eye image horizontally with respect to the first left eye image until a portion of the second left eye image overlaps at least a portion of the first left eye image to match the depth of view.

* * * * *